US012598025B2

(12) United States Patent
Liu et al.

(10) Patent No.: US 12,598,025 B2
(45) Date of Patent: Apr. 7, 2026

(54) METHOD AND DEVICE TO IMPROVE RECEPTION/TRANSMISSION RELIABILITY, AND PROVIDE COMMUNICATION FLEXIBILITY AND EFFICIENCY

(71) Applicant: SHARP KABUSHIKI KAISHA, Sakai City (JP)

(72) Inventors: Liqing Liu, Sakai City (JP); Shohei Yamada, Sakai City (JP); Hiroki Takahashi, Sakai City (JP); Meng Cheng, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 297 days.

(21) Appl. No.: 18/284,043

(22) PCT Filed: Mar. 25, 2022

(86) PCT No.: PCT/JP2022/017018
§ 371 (c)(1),
(2) Date: Sep. 25, 2023

(87) PCT Pub. No.: WO2022/215671
PCT Pub. Date: Oct. 13, 2022

(65) Prior Publication Data
US 2024/0163012 A1     May 16, 2024

(30) Foreign Application Priority Data
Apr. 6, 2021     (JP) ................................. 2021-064620

(51) Int. Cl.
*H04L 1/08*          (2006.01)
*H04W 72/044*     (2023.01)
(Continued)

(52) U.S. Cl.
CPC ............. *H04L 1/08* (2013.01); *H04W 72/044* (2013.01); *H04W 72/1268* (2013.01); *H04W 72/232* (2023.01)

(58) Field of Classification Search
CPC ..... H04L 1/08; H04L 72/044; H04L 72/1268; H04L 1/1858; H04L 1/189; H04L 5/0044; H04L 5/10; H04L 5/0051; H04W 72/232
See application file for complete search history.

(56) References Cited

U.S. PATENT DOCUMENTS

2020/0052827 A1*    2/2020  Vilaipornsawai ..... H04W 72/23
2022/0046552 A1*    2/2022  Xu ....................... H04W 52/245
(Continued)

*Primary Examiner* — Mewale A Ambaye
(74) *Attorney, Agent, or Firm* — ScienBiziP, P.C.

(57)          ABSTRACT
A user equipment includes reception circuitry configured to receive, from a base station, a PDCCH with a first DCI format, wherein the first DCI format schedules a PUSCH transmission; and control circuitry configured to perform the PUSCH transmission, in a case intra-slot frequency hopping is not enabled for the PUSCH transmission and a PUSCH repetition Type B is not applied to the PUSCH transmission, such that a first channel over which a first symbol on an antenna port used for an uplink transmission is conveyed can be inferred by the base station from a second channel over which a second symbol on the same antenna port is conveyed if the first symbol and the second symbol correspond to the same slot, and perform the PUSCH transmission in a case the PUSCH repetition Type B is applied to the PUSCH transmission, such that the first channel over which the first symbol on an antenna port used for an uplink transmission is conveyed can be inferred by the base station from the second channel over which the second symbol on the same antenna port is conveyed if the first symbol and the second symbol correspond to a same actual repetition of the PUSCH transmission.

5 Claims, 12 Drawing Sheets

500

First
symbol     504
(A)
One slot

First
symbol     508    510
(B)
One slot time

(51) Int. Cl.
 H04W 72/1268  (2023.01)
 H04W 72/232  (2023.01)

(56)    References Cited

U.S. PATENT DOCUMENTS

2022/0322394  A1*  10/2022  Yi ............................. H04L 1/08
2023/0043851  A1*   2/2023  Ouchi ................... H04W 72/23
2024/0023086  A1*   1/2024  Sun ....................... H04B 7/0639
2024/0107525  A1*   3/2024  Khan Beigi .......... H04L 5/1469

* cited by examiner subframe

200

202
$N_{grid}^{size,\mu} N_{sc}^{RB}$

206

One resource element
$(k, l)$ $k = 12 \times offset+1$
$k = 12 \times offset$ $l=0$              $l=13$ 204 $N_{symb}^{subframe,\mu}$ frequency time

METHOD AND DEVICE TO IMPROVE RECEPTION/TRANSMISSION RELIABILITY, AND PROVIDE COMMUNICATION FLEXIBILITY AND EFFICIENCY

TECHNICAL FIELD

The present disclosure relates to a user equipment, a base station, and a communication method.

BACKGROUND ART

At present, as a radio access system and a radio network technology aimed for the fifth generation cellular system, technical investigation and standard development are being conducted, as extended standards of Long Term Evolution (LTE), on LTE-Advanced Pro (LTE-A Pro) and New Radio technology (NR) in The Third Generation Partnership Project (3GPP).

In the fifth generation cellular system, three services of enhanced Mobile BroadBand (eMBB) to achieve high-speed and large-volume transmission, Ultra-Reliable and Low Latency Communication (URLLC) to achieve low-latency and high-reliability communication, and massive Machine Type Communication (mMTC) to allow connection of a large number of machine type devices such as Internet of Things (IoT) have been demanded as assumed scenarios.

For example, wireless communication devices may communicate with one or more devices for multiple service types. However, current existing systems and methods may only offer limited flexibility and efficiency for multiple service communication. As illustrated by this discussion, systems and methods according to the prevent invention, supporting channel inference for actual repetition(s) of a PUSCH transmission with repetition Type B, may improve reception/transmission reliability, and provide the communication flexibility and efficiency.

DESCRIPTION OF EMBODIMENTS

Figure 1:
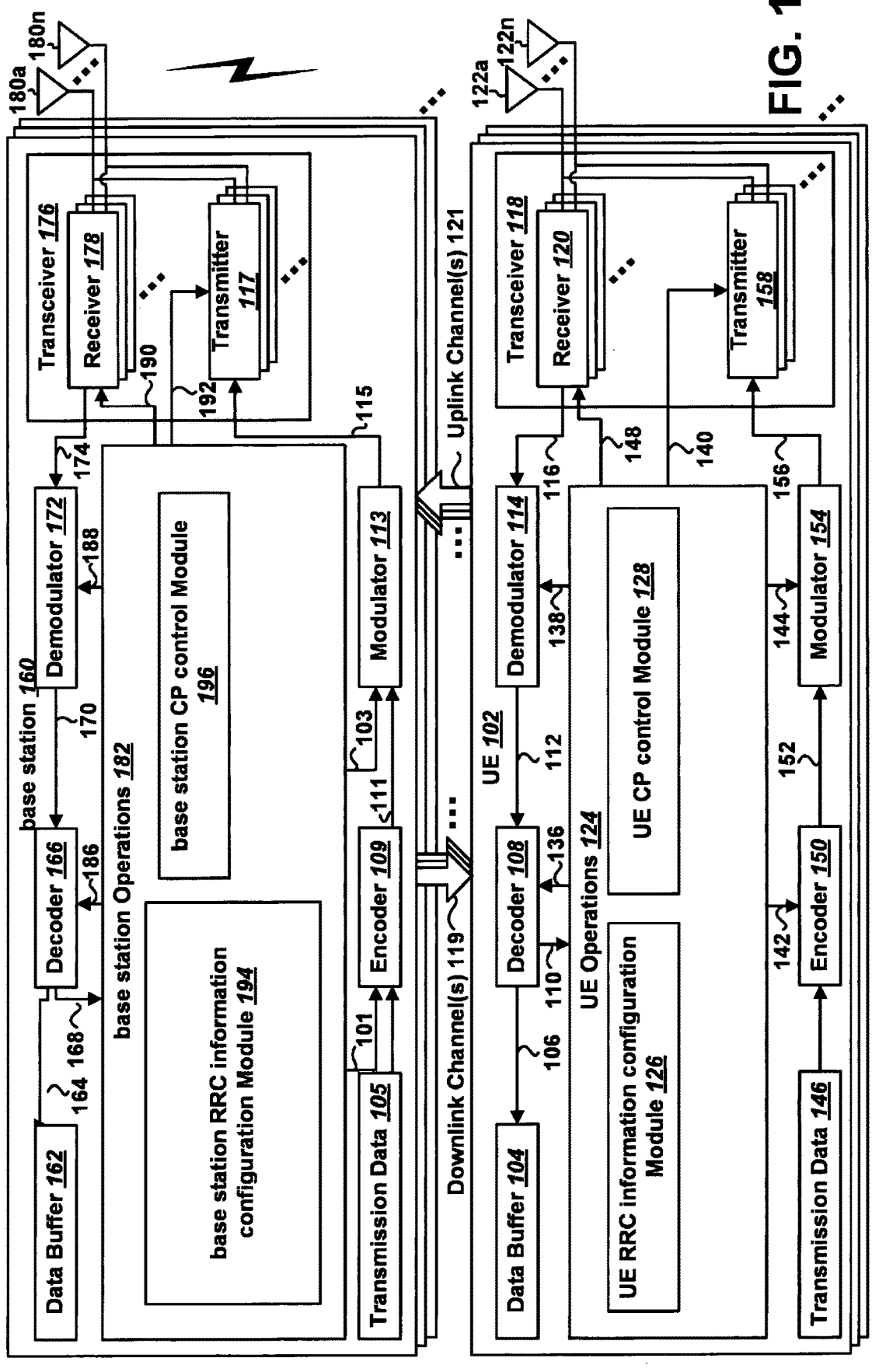
FIG. 1 is a block diagram illustrating one configuration of one or more base stations and one or more user equipments (UEs) in which systems and methods for PUSCH transmission may be implemented.

A method by a user equipment (UE) is described. The method includes receiving, from a base station, a physical downlink control channel (PDCCH) with a first DCI format, wherein the first DCI format schedules a PUSCH transmission; and performing the PUSCH transmission, in a case a PUSCH repetition Type B is not applied to the PUSCH transmission, such that a first channel over which a first symbol on an antenna port used for an uplink transmission is conveyed can be inferred by the base station from a second channel over which a second symbol on the same antenna port is conveyed if the first symbol and the second symbol correspond to the same slot; and performing the PUSCH transmission in a case the PUSCH repetition Type B is applied to the PUSCH transmission, such that the first channel over which the first symbol on an antenna port used for an uplink transmission is conveyed can be inferred by the base station from the second channel over which the second symbol on the same antenna port is conveyed if the first symbol and the second symbol correspond to a same actual repetition of the PUSCH transmission.

A method by a base station is described. The method includes transmitting, to a user equipment (UE), a physical downlink control channel (PDCCH) with a first DCI format, wherein the first DCI format schedules a PUSCH transmission; and performing the PUSCH reception, in a case a PUSCH repetition Type B is not applied to the PUSCH transmission, such that a first channel over which a first symbol on an antenna port used for an uplink transmission is conveyed can be inferred by the base station from a second channel over which a second symbol on the same antenna port is conveyed if the first symbol and the second symbol correspond to the same slot; and performing the PUSCH reception in a case the PUSCH repetition Type B is applied to the PUSCH transmission, such that the first channel over which the first symbol on an antenna port used for an uplink transmission is conveyed can be inferred by the base station from the second channel over which the second symbol on the same antenna port is conveyed if the first symbol and the second symbol correspond to a same actual repetition of the PUSCH transmission.

A user equipment (UE) is described. The UE includes reception circuitry configured to receive, from a base station, a physical downlink control channel (PDCCH) with a first DCI format, wherein the first DCI format schedules a PUSCH transmission; and control circuitry configured to perform the PUSCH transmission, in a case a PUSCH repetition Type B is not applied to the PUSCH transmission, such that a first channel over which a first symbol on an antenna port used for an uplink transmission is conveyed can be inferred by the base station from a second channel over which a second symbol on the same antenna port is conveyed if the first symbol and the second symbol correspond to the same slot, and perform the PUSCH transmission in a case the PUSCH repetition Type B is applied to the PUSCH transmission, such that the first channel over which the first symbol on an antenna port used for an uplink transmission is conveyed can be inferred by the base station from the second channel over which the second symbol on the same antenna port is conveyed if the first symbol and the second symbol correspond to a same actual repetition of the PUSCH transmission.

A base station is described. The base station includes transmission circuitry configured to transmit, to a user equipment (UE), a physical downlink control channel (PDCCH) with a first DCI format, wherein the first DCI format schedules a PUSCH transmission; and control circuitry configured to perform the PUSCH reception, in a case a PUSCH repetition Type B is not applied to the PUSCH transmission, such that a first channel over which a first symbol on an antenna port used for an uplink transmission is conveyed can be inferred by the base station from a second channel over which a second symbol on the same antenna port is conveyed if the first symbol and the second symbol correspond to the same slot, and perform the PUSCH reception in a case the PUSCH repetition Type B is applied to the PUSCH transmission, such that the first channel over which the first symbol on an antenna port used for an uplink transmission is conveyed can be inferred by the base station from the second channel over which the second symbol on the same antenna port is conveyed if the first symbol and the second symbol correspond to a same actual repetition of the PUSCH transmission.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). 3GPP NR (New Radio) is the name given to a project to improve the LTE mobile phone or device standard to cope with future requirements. In one aspect, LTE has been modified to provide support and specification (TS 38.331, 38.321, 38.300, 37.300, 38.211, 38.212, 38.213, 38.214, etc) for the New Radio Access (NR) and Next generation—Radio Access Network (NG-RAN).

At least some aspects of the systems and methods disclosed herein may be described in relation to the 3GPP LTE, LTE-Advanced (LTE-A), LTE-Advanced Pro, New Radio Access (NR), and other 3G/4G/5G standards (e.g., 3GPP Releases 8, 9, 10, 11, 12, 13, 14, 15, and/or 16, and/or Narrow Band-Internet of Things (NB-IoT)). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, a relay node, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a gNB, a Node B, an eNB, a home enhanced or evolved Node B (HeNB) or some other similar terminology. As the scope of the disclosure should not be limited to 3GPP standards, the terms "base station,", "gNB", "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced), IMT-2020 (5G) and all of it or a subset of it may be adopted by 3GPP as licensed bands (e.g., frequency bands) to be used for communication between a base station and a UE. It should also be noted that in NR, NG-RAN, E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by a base station to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The base stations may be connected by the NG interface to the 5G—core network (5G-CN). 5G-CN may be called as to NextGen core (NGC), or 5G core (5GC). The base stations may also be connected by the S1 interface to the evolved packet core (EPC). For instance, the base stations may be connected to a NextGen (NG) mobility management function by the NG-2 interface and to the NG core User Plane (UP) functions by the NG-3 interface. The NG interface supports a many-to-many relation between NG mobility management functions, NG core UP functions and the base stations. The NG-2 interface is the NG interface for the control plane and the NG-3 interface is the NG interface for the user plane. For instance, for EPC connection, the base stations may be connected to a mobility management entity (MME) by the S1-MME interface and to the serving gateway (S-GW) by the S1-U interface. The S1 interface supports a many-to-many relation between MMEs, serving gateways and the base stations. The S1-MME interface is the S1 interface for the control plane and the S1-U interface is the S1 interface for the user plane. The Uu interface is a radio interface between the UE and the base station for the radio protocol.

The radio protocol architecture may include the user plane and the control plane. The user plane protocol stack may include packet data convergence protocol (PDCP), radio link control (RLC), medium access control (MAC) and physical (PHY) layers. A DRB (Data Radio Bearer) is a radio bearer that carries user data (as opposed to control plane signaling). For example, a DRB may be mapped to the user plane protocol stack. The PDCP, RLC, MAC and PHY sublayers (terminated at the base station 460a on the network) may perform functions (e.g., header compression, ciphering, scheduling, ARQ and HARQ) for the user plane. PDCP entities are located in the PDCP sublayer. RLC entities may be located in the RLC sublayer. MAC entities may be located in the MAC sublayer. The PHY entities may be located in the PHY sublayer.

The control plane may include a control plane protocol stack. The PDCP sublayer (terminated in base station on the network side) may perform functions (e.g., ciphering and integrity protection) for the control plane. The RLC and MAC sublayers (terminated in base station on the network side) may perform the same functions as for the user plane. The Radio Resource Control (RRC) (terminated in base station on the network side) may perform the following functions. The RRC may perform broadcast functions, paging, RRC connection management, radio bearer (RB) control, mobility functions, UE measurement reporting and control. The Non-Access Stratum (NAS) control protocol (terminated in MME on the network side) may perform, among other things, evolved packet system (EPS) bearer management, authentication, evolved packet system connection management (ECM)-IDLE mobility handling, paging origination in ECM-IDLE and security control.

Signaling Radio Bearers (SRBs) are Radio Bearers (RB) that may be used only for the transmission of RRC and NAS messages. Three SRBs may be defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by a network (e.g., base station) after security activation. A broadcast control channel (BCCH) logical channel may be used for broadcasting system information. Some of BCCH logical channel may convey system information which may be sent from the network to the UE via BCH (Broadcast Channel) transport channel. BCH may be sent on a physical broadcast channel (PBCH). Some of BCCH logical channel may convey system information which may be sent from the network to the UE via DL-SCH (Downlink Shared Channel) transport channel. Paging may be provided by using paging control channel (PCCH) logical channel.

For example, the DL-DCCH logical channel may be used (but not limited to) for a RRC reconfiguration message, a RRC reestablishment message, a RRC release, a UE Capability Enquiry message, a DL Information Transfer message or a Security Mode Command message. UL-DCCH logical channel may be used (but not limited to) for a measurement report message, a RRC Reconfiguration Complete message, a RRC Reestablishment Complete message, a RRC Setup Complete message, a Security Mode Complete message, a Security Mode Failure message, a UE Capability Information, message, a UL Handover Preparation Transfer message, a UL Information Transfer message, a Counter Check Response message, a UE Information Response message, a Proximity Indication message, a RN (Relay Node) Reconfiguration Complete message, an MBMS Counting Response message, an inter Frequency RSTD Measurement Indication message, a UE Assistance Information message, an In-device Coexistence Indication message, an MBMS Interest Indication message, an SCG Failure Information message. DL-CCCH logical channel may be used (but not limited to) for a RRC Connection Reestablishment message, a RRC Reestablishment Reject message, a RRC Reject message, or a RRC Setup message. UL-CCCH logical channel may be used (but not limited to) for a RRC Reestablishment Request message, or a RRC Setup Request message.

System information may be divided into the MasterInformationBlock (MIB) and a number of SystemInformationBlocks (SIBs).

The UE may receive one or more RRC messages from the base station to obtain RRC configurations or parameters. The RRC layer of the UE may configure RRC layer and/or lower layers (e.g., PHY layer, MAC layer, RLC layer, PDCP layer) of the UE according to the RRC configurations or parameters which may be configured by the RRC messages, broadcasted system information, and so on. The base station may transmit one or more RRC messages to the UE to cause the UE to configure RRC layer and/or lower layers of the UE according to the RRC configurations or parameters which may be configured by the RRC messages, broadcasted system information, and so on.

When carrier aggregation is configured, the UE may have one RRC connection with the network. One radio interface may provide carrier aggregation. During RRC establishment, re-establishment and handover, one serving cell may provide Non-Access Stratum (NAS) mobility information (e.g., a tracking area identity (TAD). During RRC re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more SCells may be configured to form together with the PCell a set of serving cells. In the downlink, the component carrier corresponding to an SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access procedure). A PCell may be used for transmission of the PUCCH. A primary secondary cell (PSCell) may also be used for transmission of the PUCCH. The PSCell may be referred to as a primary SCG cell or SpCell of a secondary cell group. The PCell or PS Cell may not be de-activated.

Re-establishment may be triggered when the PCell experiences radio link failure (RLF), not when the SCells experience RLF. Furthermore, NAS information may be taken from the PCell.

The reconfiguration, addition and removal of SCells may be performed by RRC. At handover or reconfiguration with sync, Radio Resource Control (RRC) layer may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

The systems and methods described herein may enhance the efficient use of radio resources in Carrier aggregation (CA) operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station.

The systems and methods described herein may enhance the efficient use of radio resources in Carrier aggregation operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station. However, in a small cell deployment scenario, each node (e.g., base station, RRH, etc.) may have its own independent, scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

In Dual Connectivity (DC) the UE may be required to be capable of UL-CA with simultaneous PUCCH/PUCCH and PUCCH/PUSCH transmissions across cell-groups (CGs). In a small cell deployment scenario, each node (e.g., eNB, RRH, etc.) may have its own independent scheduler. To maximize the efficiency of radio resources utilization of both nodes, a UE may connect to two or more nodes that have different schedulers. A UE may be configured multiple groups of serving cells, where each group may have carrier aggregation operation (e.g., if the group includes more than one serving cell). A UE in RRC_CONNECTED may be configured with Dual Connectivity or MR-DC, when configured with a Master and a Secondary Cell Group. A Cell Group (CG) may be a subset of the serving cells of a UE, configured with Dual Connectivity (DC) or MR-DC, i.e. a Master Cell Group (MCG) or a Secondary Cell Group (SCG). The Master Cell Group may be a group of serving cells of a UE comprising of the PCell and zero or more secondary cells. The Secondary Cell Group (SCG) may be a group of secondary cells of a UE, configured with DC or MR-DC, comprising of the PSCell and zero or more other secondary cells. A Primary Secondary Cell (PS Cell) may be the SCG cell in which the UE is instructed to perform random access when performing the SCG change procedure. "PSCell" may be also called as a Primary SCG Cell. In Dual Connectivity or MR-DC, two MAC entities may be configured in the UE: one for the MCG and one for the SCG. Each MAC entity may be configured by RRC with a serving cell supporting PUCCH transmission and contention based Random Access. In a MAC layer, the term Special Cell (SpCell) may refer to such cell, whereas the term SCell may refer to other serving cells. The term SpCell either may refer to the PCell of the MCG or the PSCell of the SCG depending on if the MAC entity is associated to the MCG or the SCG, respectively. A Timing Advance Group (TAG) containing the SpCell of a MAC entity may be referred to as primary TAG (pTAG), whereas the term secondary TAG (sTAG) refers to other TAGs.

DC may be further enhanced to support Multi-RAT Dual Connectivity (MR-DC). MR-DC may be a generalization of the Intra-E-UTRA Dual Connectivity (DC) described in 36.300, where a multiple Rx/Tx UE may be configured to utilize resources provided by two different nodes connected via non-ideal backhaul, one providing E-UTRA access and the other one providing NR access. One node acts as a Mater Node (MN) and the other as a Secondary Node (SN). The MN and SN are connected via a network interface and at least the MN is connected to the core network. In DC, a PSCell may be a primary secondary cell. In EN-DC, a PSCell may be a primary SCG cell or SpCell of a secondary cell group.

E-UTRAN may support MR-DC via E-UTRA-NR Dual Connectivity (EN-DC), in which a UE is connected to one eNB that acts as a MN and one en-gNB that acts as a SN. The en-gNB is a node providing NR user plane and control plane protocol terminations towards the UE, and acting as Secondary Node in EN-DC. The eNB is connected to the EPC via the S1 interface and to the en-gNB via the X2 interface. The en-gNB might also be connected to the EPC via the S1-U interface and other en-gNBs via the X2-U interface.

A timer is running once it is started, until it is stopped or until it expires; otherwise it is not running. A timer can be started if it is not running or restarted if it is running. A Timer may be always started or restarted from its initial value.

For NR, a technology of aggregating NR carriers may be studied. Both lower layer aggregation like Carrier Aggregation (CA) for LTE and upper layer aggregation like DC are investigated. From layer 2/3 point of view, aggregation of carriers with different numerologies may be supported in NR.

The main services and functions of the RRC sublayer may include the following:

Broadcast of System Information related to Access Stratum (AS) and Non Access Stratum (NAS);

Paging initiated by CN or RAN;

Establishment, maintenance and release of an RRC connection between the UE and NR RAN including:

Addition, modification and release of carrier aggregation;

Addition, modification and release of Dual Connectivity in NR or between LTE and NR;

Security functions including key management;

Establishment, configuration, maintenance and release of signaling radio bearers and data radio bearers;

Mobility functions including:

Handover;

UE cell selection and reselection and control of cell selection and reselection;

Context transfer at handover.

QoS management functions;

UE measurement reporting and control of the reporting;

NAS message transfer to/from NAS from/to UE.

Each MAC entity of a UE may be configured by RRC with a Discontinuous Reception (DRX) functionality that controls the UE's PDCCH monitoring activity for the MAC entity's C-RNTI (Radio Network Temporary Identifier), CS-RNTI, INT-RNTI, SFI-RNTI, SP-CSI-RNTI, TPC-PUCCH-RNTI, TPC-PUSCH-RNTI, and TPC-SRS-RNTI. For scheduling at cell level, the following identities are used:

C (Cell)-RNTI: unique UE identification used as an identifier of the RRC Connection and for scheduling;

CS (Configured Scheduling)-RNTI: unique UE identification used for Semi-Persistent Scheduling in the downlink;

INT-RNTI: identification of pre-emption in the downlink;

P-RNTI: identification of Paging and System Information change notification in the downlink;

SI-RNTI: identification of Broadcast and System Information in the downlink;

SP-CSI-RNTI: unique UE identification used for semi-persistent CSI reporting on PUSCH;

CI-RNTI: Cancellation Indication RNTI for Uplink.

For power and slot format control, the following identities are used:

SFI-RNTI: identification of slot format;

TPC-PUCCH-RNTI: unique UE identification to control the power of PUCCH;

TPC-PUSCH-RNTI: unique UE identification to control the power of PUSCH;

TPC-SRS-RNTI: unique UE identification to control the power of SRS;

During the random access procedure, the following identities are also used:

RA-RNTI: identification of the Random Access Response in the downlink;

Temporary C-RNTI: UE identification temporarily used for scheduling during the random access procedure;

Random value for contention resolution: UE identification temporarily used for contention resolution purposes during the random access procedure.

For NR connected to 5GC, the following UE identities are used at NG-RAN level:

I-RNTI: used to identify the UE context in RRC_INACTIVE.

The size of various fields in the time domain is expressed in time units $T_c=1/(\Delta f_{max} \times N_f)$ where $\Delta f_{max}=480 \times 10^3$ Hz and $N_f=4096$. The constant $K=T_s/T_c=64$ where $T_s=1/(\Delta f_{ref} \cdot N_{f,ref})$, $\Delta f_{ref}=15 \cdot 10^3$ Hz and $N_{f,ref}=2048$.

Multiple OFDM numerologies are supported as given by Table 4.2-1 of [TS 38.211] where and the cyclic prefix for a bandwidth part are obtained from the higher-layer parameter subcarrierSpacing and cyclicPrefix, respectively.

The size of various fields in the time domain may be expressed as a number of time units $T_c=1/(15000 \times 2048)$ seconds. Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

For subcarrier spacing (SCS) configuration $\mu$, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. $N_{slot}^{subframe,\mu}$ is the number of slots per subframe for subcarrier spacing configuration $\mu$. There are $N_{symb}^{slot}$ consecutive OFDM symbols in a slot where $N_{symb}^{slot}$ depends on the cyclic prefix as given by Tables 4.3.2-1 and 4.3.2-2 of [TS 38.211]. The start of slot $n_s^\mu$ in a subframe is aligned in time with the start of OFDM symbol $n_s^\mu N_{symb}^{slot}$ in the same subframe. Subcarrier spacing refers to a spacing (or frequency bandwidth) between two consecutive subcarrier in the frequency domain. For example, the subcarrier spacing can be set to 15 kHz (i.e. $\mu=0$), 30 kHz (i.e. $\mu=1$), 60 kHz (i.e. $\mu=2$), 0.120 kHz (i.e. $\mu=3$), or 240 kHz (i.e. $\mu=4$). A resource block is defined as a number of consecutive subcarriers (e.g. 12) in the frequency domain. For a carrier with different frequency, the applicable subcarrier may be different. For example, for a carrier in a frequency rang 1, a subcarrier spacing only among a set of {15 kHz, 30 kHz, 60 kHz} is applicable. For a carrier in a frequency rang 2, a subcarrier spacing only among a set of {60 kHz, 120 kHz, 240 kHz} is applicable. The base station may not configure an inapplicable subcarrier spacing for a carrier.

OFDM symbols in a slot can be classified as 'downlink', 'flexible', or 'uplink'. Signaling of slot formats is described in subclause 11.1 of [TS 38.213].

In a slot in a downlink frame, the UE may assume that downlink transmissions only occur in 'downlink' or 'flexible' symbols. In a slot in an uplink frame, the UE may only transmit in 'uplink' or 'flexible' symbols.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more base stations 160 (e.g., eNB, gNB) and one or more user equipments (UEs) 102 in which systems and methods for PUSCH transmission in a set of multiple sets may be implemented. The one or more UEs 102 may communicate with one or more base stations 160 using one or more antennas 122a-n. For example, a UE 102 transmits electromagnetic signals to the base station 160 and receives electromagnetic signals from the base station 160 using the one or more antennas 122a-n. The base station 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the base stations 160 described herein may be implemented in a single device. For example, multiple base stations 160 may be combined into a single device in some implementations. In the context of FIG. 1, for instance, a single device may include one or more UEs 102 in accordance with the systems and methods described herein. Additionally or alternatively, one or more base stations 160 in accordance with the systems and methods described herein may be implemented as a single device or multiple devices.

The UE 102 and the base station 160 may use one or more channels 119, 121 to communicate with each other. For example, a UE 102 may transmit information or data to the base station 160 using one or more uplink (UL) channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more base stations 160 may also transmit information or data to the one or more UEs 102 using one or more downlink (DL) channels 119 and signals, for instance. Examples of downlink channels 119 include a PDCCH, a PDSCH, etc. A PDCCH can be used to schedule DL transmissions on PDSCH and UL transmissions on PUSCH, where the Downlink Control Information (DCI) on PDCCH includes downlink assignment and uplink scheduling grants. The PDCCH is used for transmitting Downlink Control Information (DCI) in a case of downlink radio communication (radio communication from the base station to the UE). Here, one or more DCIs (may be referred to as DCI formats) are defined for transmission of downlink control information. Information bits are mapped to one or more fields defined in a DCI format. Examples of downlink signals include a primary synchronization signal (PSS), a secondary synchronization signal (SSS), a cell-specific reference signal (CRS), a non-zero power channel state information reference signal (NZP CSI-RS), and a zero power channel state information reference signal (ZP CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the base station 160 using one or more antennas 122a-n. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the base station 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more base stations 160. The UE operations module 124 may include a UE RRC information configuration module 126. The UE operations module 124 may include a UE channel process (CP) control module 128. In some implementations, the UE operations module 124 may include physical (PHY) entities, Medium Access Control (MAC) entities, Radio Link Control (RLC) entities, packet data convergence protocol (PDCP) entities, and an Radio Resource Control (RRC) entity. For example, the UE RRC information configuration module 126 may process RRC parameter for PUSCH configurations related to PUSCH repetition Type, PUSCH repetition, frequency hopping, frequency offset and so on. The UE CP control module (processing module) 128 may perform the PUSCH transmission, in a case a PUSCH repetition Type B is not applied to the PUSCH transmission, such that a first channel over which a first symbol on an antenna port used for an uplink transmission is conveyed can be inferred by the base station from a second channel over which a second symbol on the same antenna port is conveyed if the first symbol and the second symbol correspond to the same slot, and perform the PUSCH transmission in a case the PUSCH repetition Type B is applied to the PUSCH transmission, such that the first channel over which the first symbol on an antenna port used for an uplink transmission is conveyed can be inferred by the base station from the second channel over which the second symbol on the same antenna port is conveyed if the first symbol and the second symbol correspond to a same actual repetition of the PUSCH transmission.

The UE operations module 124 may provide information 148 to the one or more receivers 120. For example, the UE operations module 124 may inform the receiver(s) 120 when or when not to receive transmissions based on the Radio Resource Control (RRC) message (e.g., broadcasted system information, RRC reconfiguration message), MAC control element, and/or the DCI (Downlink Control Information). The UE operations module 124 may provide information 148, including the PDCCH monitoring occasions, and DCI format size, to the one or more receivers 120. The UE operation module 124 may inform the receiver(s) 120 when or where to receive/monitor the PDCCH candidate for DCI formats with which DCI size.

The UE operations module 124 may provide information 138 to the demodulator 114. For example, the UE operations module 124 may inform the demodulator 114 of a modulation pattern anticipated for transmissions from the base station 160.

The UE operations module 124 may provide information 136 to the decoder 108. For example, the UE operations module 124 may inform the decoder 108 of an anticipated encoding for transmissions from the base station 160. For example, the UE operations module 124 may inform the decoder 108 of an anticipated PDCCH candidate encoding with which DCI size for transmissions from the base station 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the base station 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the base station 160. The one or more transmitters 158 may upconvert and transmit the modulated signal(s) 156 to one or more base stations 160.

The base station 160 may include one or more transceivers 176, one or more demodulators 172, one or more decoders 166, one or more encoders 109, one or more modulators 113, one or more data buffers 162 and one or more base station operations modules 182. For example, one or more reception and/or transmission paths may be implemented in a base station 160. For convenience, only a single transceiver 176, decoder 166, demodulator 172, encoder 109 and modulator 113 are illustrated in the base station 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The base station 160 may use the decoder 166 to decode signals. The decoder 166 may produce one or more decoded signals 164, 168. For example, a first base station-decoded signal 164 may comprise received payload data, which may be stored in a data buffer 162. A second base station-decoded signal 168 may comprise overhead data and/or control data. For example, the second base station-decoded signal 168 may provide data (e.g., PUSCH transmission data) that may be used by the base station operations module 182 to perform one or more operations.

In general, the base station operations module 182 may enable the base station 160 to communicate with the one or more UEs 102. The base station operations module 182 may include a base station RRC information configuration module 194. The base station operations module 182 may include a base station channel process (CP) control module 196 (or a base station CP processing module 196). The base station operations module 182 may include PHY entities, MAC entities, RLC entities, PDCP entities, and an RRC entity.

For example, the base station RRC information configuration module 194 may determine for respective UE, RRC parameter for PUSCH configurations related to PUSCH repetition Type, PUSCH repetition, frequency hopping, frequency offset and so on. The base station CP control module 196 may perform the PUSCH reception, in a case a PUSCH repetition Type B is not applied to the PUSCH transmission, such that a first channel over which a first symbol on an antenna port used for an uplink transmission is conveyed can be inferred by the base station from a second channel over which a second symbol on the same antenna port is conveyed if the first symbol and the second symbol correspond to the same slot, and perform the PUSCH transmission in a case the PUSCH repetition Type B is applied to the PUSCH transmission, such that the first channel over which the first symbol on an antenna port used for an uplink transmission is conveyed can be inferred by the base station from the second channel over which the second symbol on the same antenna port is conveyed if the first symbol and the second symbol correspond to a same actual repetition of the PUSCH transmission.

The base station CP control module 196 may input the determined information to the base station RRC information configuration module 194. The base station RRC information configuration module 194 may generate RRC parameters for search space configurations and CORESET configuration based on the output from the base station RA control module 196.

The base station operations module 182 may provide the benefit of performing PDCCH candidate search and monitoring efficiently.

The base station operations module 182 may provide information 190 to the one or more receivers 178. For example, the base station operations module 182 may inform the receiver(s) 178 when or when not to receive transmissions based on the RRC message (e.g., broadcasted system information, RRC reconfiguration message), MAC control element, and/or the DCI (Downlink Control Information).

The base station operations module 182 may provide information 188 to the demodulator 172. For example, the base station operations module 182 may inform the demodulator 172 of a modulation pattern anticipated for transmissions from the UE(s) 102.

The base station operations module 182 may provide information 186 to the decoder 166. For example, the base station operations module 182 may inform the decoder 166 of an anticipated encoding for transmissions from the UE(s) 102.

The base station operations module 182 may provide information 101 to the encoder 109. The information 101 may include data to be encoded and/or instructions for encoding. For example, the base station operations module 182 may instruct the encoder 109 to encode transmission data 105 and/or other information 101.

In general, the base station operations module 182 may enable the base station 160 to communicate with one or more network nodes (e.g., a NG mobility management function, a NG core UP functions, a mobility management entity (MME), serving gateway (S-GW), gNBs). The base station operations module 182 may also generate a RRC reconfiguration message to be signaled to the UE 102.

The encoder 109 may encode transmission data 105 and/or other information 101 provided by the base station operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The base station operations module 182 may provide information 103 to the modulator 113. This information 103 may include instructions for the modulator 113. For example, the base station operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The base station operations module 182 may provide information 192 to the one or more transmitters 117. This information 192 may include instructions for the one or more transmitters 117. For example, the base station operations module 182 may instruct the one or more transmitters 117 when to (or when not to) transmit a signal to the UE(s) 102. The base station operations module 182 may provide information 192, including the PDCCH monitoring occasions and DCI format size, to the one or more transmitters 117. The base station operation module 182 may inform the transmitter(s) 117 when or where to transmit the PDCCH candidate for DCI formats with which DCI size. The one or more transmitters 117 may upconvert and transmit the modulated signal(s) 115 to one or more UEs 102.

It should be noted that one or more of the elements or parts thereof included in the base station(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

A base station may generate a RRC message including the one or more RRC parameters, and transmit the RRC message to a UE. A UE may receive, from a base station, a RRC message including one or more RRC parameters. The term 'RRC parameter(s)' in the present disclosure may be alternatively referred to as 'RRC information element(s)'. A RRC parameter may further include one or more RRC parameter(s). In the present disclosure, a RRC message may include system information. a RRC message may include one or more RRC parameters. A RRC message may be sent on a broadcast control channel (BCCH) logical channel, a common control channel (CCCH) logical channel or a dedicated control channel (DCCH) logical channel.

In the present disclosure, a description 'a base station may configure a UE to' may also imply/refer to 'a base station may transmit, to a UE, an RRC message including one or more RRC parameters'. Additionally or alternatively, 'RRC parameter configure a UE to' may also refer to 'a base station may transmit, to a UE, an RRC message including one or more RRC parameters'. Additionally or alternatively, 'a UE is configured to' may also refer to 'a UE may receive, from a base station, an RRC message including one or more RRC parameters'.

Figure 2:
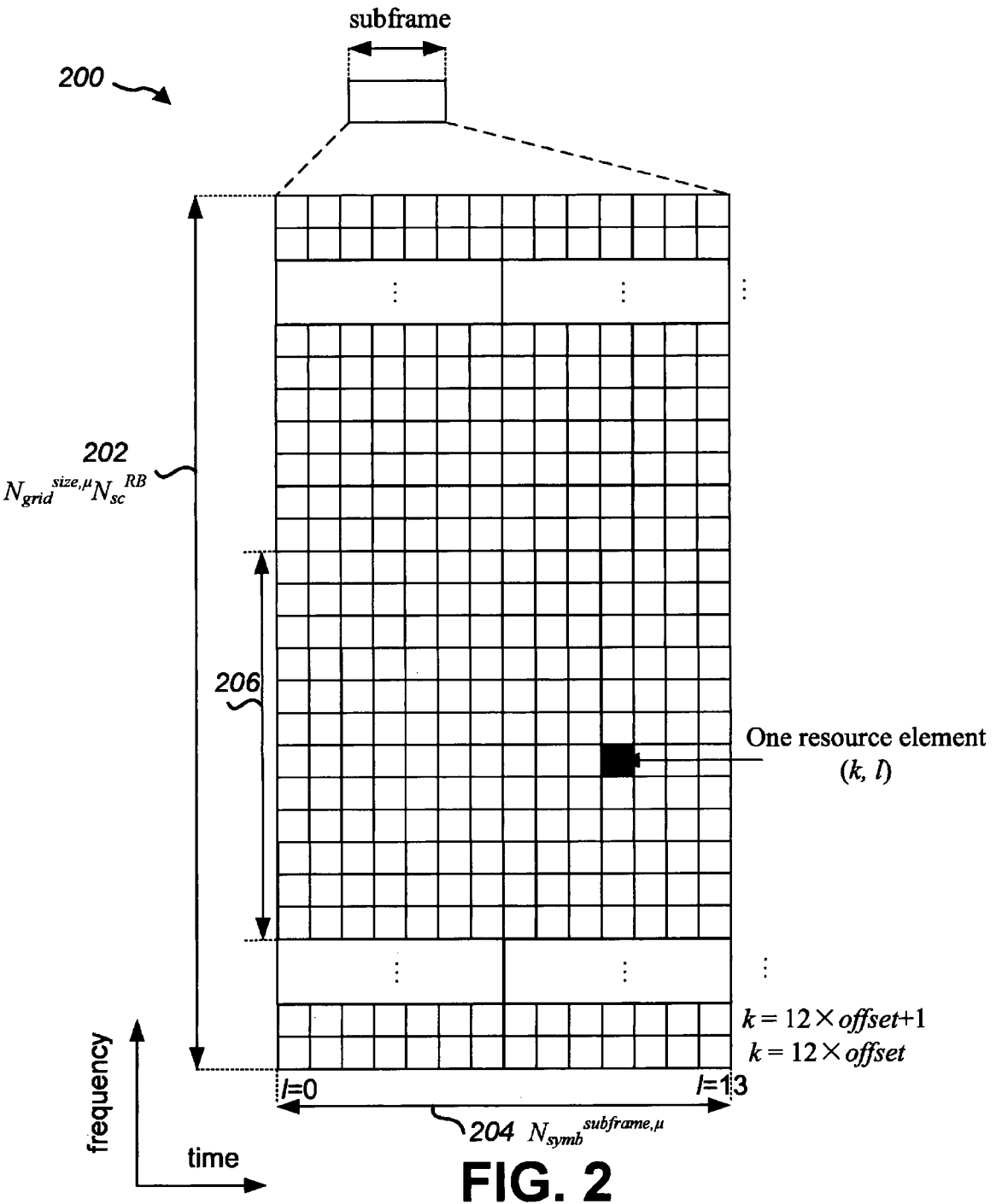
FIG. 2 is a diagram illustrating one example 200 of a resource grid.

FIG. 2 is a diagram illustrating one example of a resource grid 200.

For each numerology and carrier, a resource grid of $N_{grid,x}^{size,\mu} N_{sc}^{RB}$ subcarriers and $N_{symb}^{subframe,\mu}$ OFDM symbols is defined, starting at common resource block $N_{grid}^{start,\mu}$ indicated by higher layer signaling. There is one set of resource grids per transmission direction (uplink or downlink) with the subscript x set to DL and UL for downlink and uplink, respectively. There is one resource grid for a given antenna port p, subcarrier spacing configuration $\mu$, and the transmission direction (downlink or uplink). When there is no risk for confusion, the subscript x may be dropped.

In the FIG. 2, the resource gird 200 includes the $N_{grid,x}^{size,\mu} N_{sc}^{RB}$ (202) subcarriers in the frequency domain and includes $N_{symb}^{subframe,\mu}$ (204) symbols in the time domain. In the FIG. 2, as an example for illustration, the subcarrier spacing configuration $\mu$ is set to 0. That is, in the FIG. 2, the number of consecutive OFDM symbols $N_{symb}^{subframe,\mu}$ (204) per subframe is equal to 14.

The carrier bandwidth $N_{grid}^{size,\mu}$ ($N_{grid,x}^{size,\mu}$) for subcarrier spacing configuration $\mu$ is given by the higher-layer (RRC) parameter carrierBandwidth in the SCS-SpecificCarrier IE. The starting position $N_{grid}^{start,\mu}$ for subcarrier spacing configuration $\mu$ is given by the higher-layer parameter offsetToCarrier in the SCS-SpecificCarrier IE. The frequency location of a subcarrier refers to the center frequency of that subcarrier.

In the FIG. 2, for example, a value of offset is provided by the higher-layer parameter offsetToCarrier. That is, k=12×offset is the lowest usable subcarrier on this carrier.

Each element in the resource grid for antenna port p and subcarrier spacing configuration $\mu$ is called a resource element and is uniquely identified by $(k, 1)_{p,\mu}$ where k is the index in the frequency domain and 1 refers to the symbols position in the time domain relative to same reference point. The resource element consists of one subcarrier during one OFDM symbol.

A resource block is defined as $N_{sc}^{RB}=12$ consecutive subcarriers in the frequency domain. As shown in the FIG. 2, a resource block 206 includes 12 consecutive subcarriers in the frequency domain. Resource block can be classified as common resource block (CRB) and physical resource block (PRB).

Common resource blocks are numbered from 0 and upwards in the frequency domain for subcarrier spacing configuration p. The center of subcarrier 0 of common resource block with index 0 (i.e. CRB0) for subcarrier spacing configuration $\mu$ coincides with point A. The relation between the common resource block number $n_{CRB}^{\mu}$ in the frequency domain and resource element (k, l) for subcarrier spacing configuration $\mu$ is given by Formula (1) $n_{CRB}^{\mu}$=floor $(k/N_{sc}^{RB})$ where k is defined relative to the point A such that k=0 corresponds to the subcarrier centered around the point A. The function floor(A) hereinafter is to output a maximum integer not larger than the A.

Point A refers to as a common reference point. Point A coincides with subcarrier 0 (i.e. k=0) of a CRB 0 for all subcarrier spacing. Point A can be obtained from a RRC parameter offsetToPointA or a RRC parameter absoluteFrequencyPointA. The RRC parameter offsetToPointA is used for a PCell downlink and represents the frequency offset between point A and the lowest subcarrier of the lowest resource block, which has the subcarrier spacing provided by a higher-layer parameter subCarrierSpacingCommon and overlaps with the SS/PBCH block used by the UE for initial cell selection, expressed in units of resource blocks assuming 15 kHz subcarrier spacing for frequency range (FR) 1 and 60 kHz subcarrier spacing for frequency range (FR2). FR1 corresponds to a frequency range between 410 MHz and 7125 MHz. FR2 corresponds to a frequency range between 24250 MHz and 52600 MHz. The RRC parameter absoluteFrequencyPointA is used for all cased other than the PCell case and represents the frequency-location of point A expressed as in ARFCN. The frequency location of point A can be the lowest subcarrier of the carrier bandwidth (or the actual carrier). Additionally, point A may be located outside the carrier bandwidth (or the actual carrier).

As above mentioned, the information element (IE)SCS-SpecificCarrier provides parameters determining the location and width of the carrier bandwidth or the actual carrier. That is, a carrier (or a carrier bandwidth, or an actual carrier) is determined (identified, or defined) at least by a RRC parameter offsetToCarrier, a RRC parameter subcarrier-Spacing, and a RRC parameter carrierBandwidth in the SCS-SpecificCarrier IE.

The subcarrierSpacing indicates (or defines) a subcarrier spacing of the carrier. The offsetToCarrier indicates an offset in frequency domain between point A and a lowest usable subcarrier on this carrier in number of resource blocks (e.g. CRBs) using the subcarrier spacing defined for the carrier. The carrierBandwidth indicates width of this carrier in number of resource blocks (e.g. CRBs or PRBs) using the subcarrier spacing defined for the carrier. A carrier includes at most 275 resource blocks.

Physical resource block for subcarrier spacing configuration $\mu$ are defined within a bandwidth part and numbered form 0 to $N_{BWP,\ i}^{size,\ \mu}$ where i is the number of the bandwidth part. The relation between the physical resource block $n_{PRB}^{\mu}$ in bandwidth part (BWP) i and the common resource block $n_{CRB}^{\mu}$ is given by Formula (2) $n_{CRB}^{\mu}=n_{PRB}^{\mu}+N_{BWP,i}^{start,\ \mu}$ where $N_{BWR,i}^{start,\ \mu}$ is the common resource block where bandwidth part i starts relative to common resource block 0 (CRB0). When there is no risk for confusion the index $\mu$ may be dropped.

A BWP is a subset of contiguous common resource block for a given subcarrier spacing configuration p on a given carrier. To be specific, a BWP can be identified (or defined) at least by a subcarrier spacing $\mu$ indicated by the RRC parameter subcarrierSpacing, a cyclic prefix determined by the RRC parameter cyclicPrefix, a frequency domain location, a bandwidth, an BWP index indicated by bwp-Id and so on. The locationAndBandwidth can be used to indicate the frequency domain location and bandwidth of a BWP. The value indicated by the locationAndBandwidth is interpreted as resource indicator value (RIV) corresponding to an offset (an starting resource block) $RB_{start}$ and a length $L_{RB}$ in terms of contiguously resource blocks. The offset $RB_{start}$ is a number of CRBs between the lowest CRB of the carrier and the lowest CRB of the BWP. The $N_{BWP,i}^{start,\ \mu}$ is given as Formula (3) $N_{BWP,i}^{start,\ \mu}=O_{carrier}+RB_{start}$. The value of $O_{carrier}$ is provided by offsetToCarrier for the corresponding subcarrier spacing configuration $\mu$.

A UE 102 configured to operation in BWPs of a serving cell, is configured by higher layers for the serving cell a set of at most four BWPs in the downlink for reception. At a given time, a single downlink BWP is active. The bases station 160 may not transmit, to the UE 102, PDSCH and/or PDCCH outside the active downlink BWP. A UE 102 configured to operation in BWPs of a serving cell, is configured by higher layers for the serving cell a set of at most four BWPs for transmission. At a given time, a single uplink BWP is active. The UE 102 may not transmit, to the base station 160, PUSCH or PUCCH outside the active BWP. The specific signaling (higher layers signaling) for BWP configurations are described later.

Figure 3:
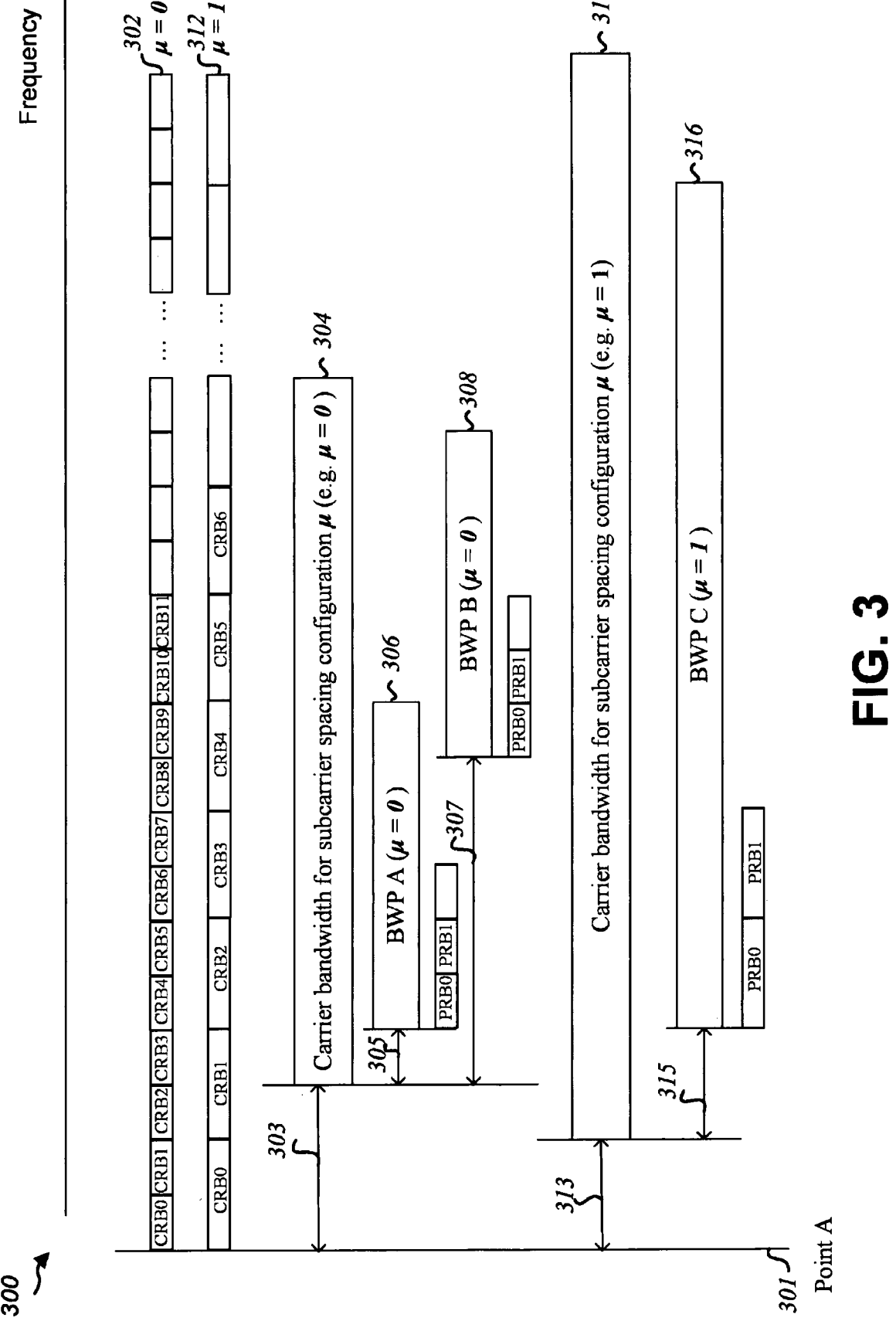
FIG. 3 is a diagram illustrating one example 300 of common resource block grid, carrier configuration and BWP configuration by a UE 102 and a base station 160.

FIG. 3 is a diagram illustrating one example 300 of common resource block grid, carrier configuration and BWP configuration by a UE 102 and a base station 160.

Point A 301 is a lowest subcarrier of a CRB0 for all subcarrier spacing configurations. The CRB grid 302 and the CRB grid 312 are corresponding to two different subcarrier spacing configurations. The CRB grid 302 is for subcarrier spacing configuration $\mu=0$ (i.e. the subcarrier spacing with 15 kHz). The CRB grid 312 is for subcarrier spacing configuration $\mu=1$ (i.e. the subcarrier spacing with 30 kHz).

One or more carrier are determined by respective SCS-SpecificCarrier IEs, respectively. In the FIG. 3, the carrier 304 uses the subcarrier spacing configuration $\mu=0$. And the carrier 314 uses the subcarrier spacing configuration $\mu=1$. The starting position $N_{grid}^{start,\mu}$ of the carrier 304 is given based on the value of an offset 303 (i.e. $O_{carrier}$) indicated by an offsetToCarrier in an SCS-SpecificCarrier IE. As shown in the FIG. 3, for example, the offsetToCarrier indicates the value of the offset 303 as $O_{carrier}=3$. That is, the starting position $N_{grid}^{start,\mu}$ of the carrier 304 corresponds to the CRB3 of the CRB grid 302 for subcarrier spacing configuration $\mu=0$. In the meantime, the starting position $N_{grid}^{start,\mu}$ of the carrier 314 is given based on the value of an offset 313 (i.e. $O_{carrier}$) indicated by an offsetToCarrier in another SCS-SpecificCarrier IE. For example, the offsetToCarrier indicates the value of the offset 313 as $O_{carrier}=1$. That is, the starting position $N_{grid}^{start,\mu}$ of the carrier 314 corresponds to the CRB1 of the CRB grid 312 for subcarrier spacing configuration $\mu=1$. A carrier using different subcarrier spacing configurations can occupy different frequency ranges.

As above-mentioned, a BWP is for a given subcarrier spacing configuration $\mu$. One or more BWPs can be configured for a same subcarrier spacing configuration $\mu$. For example, in the FIG. 3, the BWP 306 is identified at least by the $\mu=0$, a frequency domain location, a bandwidth ($L_{RB}$), and an BWP index (index A). The first PRB (i.e. PRB0) of a BWP is determined at least by the subcarrier spacing of the BWP, an offset derived by the locationAndBandwidth and an offset indicated by the offsetToCarrier corresponding to the subcarrier spacing of the BWP. An offset 305 ($RB_{start}$) is derived as 1 by the locationAndBandwidth. According to the Formulas (2) and (3), the PRB0 of BWP 306 corresponds to CRB 4 of the CRB grid 302, and the PRB1 of BWP 306 corresponds to CRB 5 of the CRB grid 302, and so on.

Additionally, in the FIG. 3, the BWP 308 is identified at least by the $\mu=0$, a frequency domain location, a bandwidth ($L_{RB}$), and an BWP index (index B). For example, an offset 307 ($RB_{start}$) is derived as 6 by the locationAndBandwidth. According to the Formulas (2) and (3), the PRB0 of BWP 308 corresponds to CRB 9 of the CRB grid 302, and the PRB1 of BWP 308 corresponds to CRB 10 of the CRB grid 302, and so on.

Additionally, in the FIG. 3, the BWP 316 is identified at least by the $\mu=1$, a frequency domain location, a bandwidth ($L_{RB}$), and an BWP index (index C). For example, an offset 315 ($RB_{start}$) is derived as 1 by the locationAndBandwidth. According to the Formulas (2) and (3), the PRB0 of BWP 316 corresponds to CRB 2 of the CRB grid 312, and the PRB1 of BWP 316 corresponds to CRB 3 of the CRB grid 312, and so on.

As shown in the FIG. 3, a carrier with the defined subcarrier spacing locate in a corresponding CRB grid with the same subcarrier spacing. A BWP with the defined subcarrier spacing locate in a corresponding CRB grid with the same subcarrier spacing as well.

A base station may transmit a RRC message including one or more RRC parameters related to BWP configuration to a UE. A UE may receive the RRC message including one or more RRC parameters related to BWP configuration from a base station. For each cell, the base station may configure at least an initial DL BWP and one initial uplink bandwidth parts (initial UL BWP) to the UE. Furthermore, the base station may configure additional UL and DL BWPs to the UE for a cell.

A RRC parameters initialDownlinkBWP may indicate the initial downlink BWP (initial DL BWP) configuration for a serving cell (e.g., a SpCell and Scell). The base station may configure the RRC parameter locationAndBandwidth included in the initialDownlinkBWP so that the initial DL BWP contains the entire CORESET 0 of this serving cell in the frequency domain. The locationAndBandwidth may be used to indicate the frequency domain location and bandwidth of a BWP. A RRC parameters initialUplinkBWP may indicate the initial uplink BWP (initial UL BWP) configuration for a serving cell (e.g., a SpCell and Scell). The base station may transmit initialDownlinkBWP and/or initialUplinkBWP which may be included in SIB1, RRC parameter ServingCellConfigCommon, or RRC parameter ServingCellConfig to the UE.

SIB1, which is a cell-specific system information block (SystemInformationBlock, SIB), may contain information relevant when evaluating if a UE is allowed to access a cell and define the scheduling of other system information. SIB1 may also contain radio resource configuration information that is common for all UEs and barring information applied to the unified access control. The RRC parameter ServingCellConfigCommon is used to configure cell specific parameters of a UE's serving cell. The RRC parameter ServingCellConfig is used to configure (add or modify) the UE with a serving cell, which may be the SpCell or an SCell of an MCS or SCG. The RRC parameter ServingCellConfig herein are mostly UE specific but partly also cell specific.

The base station may configure the UE with a RRC parameter BWP-Downlink and a RRC parameter BWP-Uplink. The RRC parameter BWP-Downlink can be used to configure an additional DL BWP. The RRC parameter BWP-Uplink can be used to configure an additional UL BWP. The base station may transmit the BWP-Downlink and the BWP-Uplink which may be included in RRC parameter ServingCellConfig to the UE.

If a UE is not configured (provided) initialDownlinkBWP from a base station, an initial DL BWP is defined by a location and number of contiguous physical resource blocks (PRBs), starting from a PRB with the lowest index and ending at a PRB with the highest index among PRBs of a CORESET for Type0-PDCCH CSS set (i.e. CORESET 0), and a subcarrier spacing (SCS) and a cyclic prefix for PDCCH reception in the CORESET for Type0-PDCCH CSS set. If a UE is configured (provided) initialDownlinkBWP from a base station, the initial DL BWP is provided by initialDownlinkBWP. If a UE is configured (provided) initialUplinkBWP from a base station, the initial UL BWP is provided by initialUplinkBWP.

The UE may be configured by the based station, at least one initial BWP and up to 4 additional BWP(s). One of the initial BWP and the configured additional BWP(s) may be activated as an active BWP. The UE may monitor DCI format, and/or receive PDSCH in the active DL BWP. The UE may not monitor DCI format, and/or receive PDSCH in a DL BWP other than the active DL BWP. The UE may transmit PUSCH and/or PUCCH in the active UL BWP. The UE may not transmit PUSCH and/or PUCCH in a BWP other than the active UL BWP.

As above-mentioned, a UE may monitor DCI format in the active DL BWP. To be more specific, a UE may monitor a set of PDCCH candidates in one or more CORESETs on the active DL BWP on each activated serving cell configured with PDCCH monitoring according to corresponding search space set where monitoring implies decoding each PDCCH candidate according to the monitored DCI formats.

A set of PDCCH candidates for a UE to monitor is defined in terms of PDCCH search space sets. A search space set can be a CSS set or a USS set. A UE may monitor a set of PDCCH candidates in one or more of the following search space sets a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSystemInformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI or a TC-RNTI on the primary cell a Type2-PDCCH CSS set configured by paging-SearchSpace in PDCCH-ConfigCommon for a DCI format with CRC scrambled by a P-RNTI on the primary cell of the MCG a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

For a DL BWP, if a UE is configured (provided) one above-described search space set, the UE may determine PDCCH monitoring occasions for a set of PDCCH candidates of the configured search space set. PDCCH monitoring occasions for monitoring PDCCH candidates of a search space set s is determined according to the search space set s configuration and a CORESET configuration associated with the search space set s. In other words, a UE may monitor a set of PDCCH candidates of the search space set in the determined (configured) PDCCH monitoring occasions in one or more configured control resource sets (CORESETs) according to the corresponding search space set configurations and CORESET configuration. A base station may transmit, to a UE, information to specify one or more CORESET configuration and/or search space configuration. The information may be included in MIB and/or SIBs broadcasted by the base station. The information may be included in RRC configurations or RRC parameters. A base station may broadcast system information such as MIB, SIBs to indicate CORESET configuration or search space configuration to a UE. Or the base station may transmit a RRC message including one or more RRC parameters related to CORESET configuration and/or search space configuration to a UE.

An illustration of search space set configuration is described below.

A base station may transmit a RRC message including one or more RRC parameters related to search space configuration. A base station may determine one or more RRC parameter(s) related to search space configuration for a UE. A UE may receive, from a base station, a RRC message including one or more RRC parameters related to search space configuration. RRC parameter(s) related to search space configuration (e.g. SearchSpace, searchSpaceZero) defines how and where to search for PDCCH candidates. 'search/monitor for PDCCH candidate for a DCI format' may also refer to 'monitor/search for a DCI format' for short.

For example, a RRC parameter searchSpaceZero is used to configure a common search space 0 of an initial DL BWP. The searchSpaceZero corresponds to 4 bits. The base station may transmit the searchSpaceZero via PBCH(MIB) or ServingCell.

Additionally, a RRC parameter SearchSpace is used to define how/where to search for PDCCH candidates. The RRC parameters search space may include a plurality of RRC parameters as like, searchSpaceId, controlResourceSedd, monitoringSlotPeriodicityAndOffset, duration, monitoringSymbolsWithinSlot, nrofCandidates, searchSpaceType. Some of the above-mentioned RRC parameters may be present or absent in the RRC parameters SearchSpace. Namely, the RRC parameter SearchSpace may include all the above-mentioned RRC parameters. Namely, the RRC parameter SearchSpace may include one or more of the above-mentioned RRC parameters. If some of the parameters are absent in the RRC parameter SearchSpace, the UE 102 may apply a default value for each of those parameters.

Herein, the RRC parameter searchSpaceId is an identity or an index of a search space. The RRC parameter searchSpaceId is used to identify a search space. Or rather, the RRC parameter serchSpaceId provide a search space set index s, $0<=s<40$. Then a search space s hereinafter may refer to a search space identified by index s indicated by RRC parameter searchSpaceId. The RRC parameter controlResourceSetId concerns an identity of a CORESET, used to identify a CORESET. The RRC parameter controlResourceSetId indicates an association between the search space s and the CORESET identified by controlResourceSetId. The RRC parameter controlResourceSetId indicates a CORESET applicable for the search space. CORESET p hereinafter may refer to a CORESET identified by index p indicated by RRC parameter controlResourceSetId. Each search space is associated with one CORESET. The RRC parameter monitoringSlotPeriodicityAndOffset is used to indicate slots for PDCCH monitoring configured as periodicity and offset. Specifically, the RRC parameter monitoringSlotPeriodicityAndOffset indicates a PDCCH monitoring periodicity of $k_s$ slots and a PDCCH monitoring offset of $o_s$ slots. A UE can determine which slot is configured for PDCCH monitoring according to the RRC parameter monitoringSlotPeriodicityAndOffset. The RRC parameter monitoringSymbolsWithinSlot is used to indicate a first symbol(s) for PDCCH monitoring in the slots configured for PDCCH monitoring. That is, the parameter monitoringSymbolsWithinSlot provides a PDCCH monitoring pattern within a slot, indicating first symbol(s) of the CORESET within a slot (configured slot) for PDCCH monitoring. The RRC parameter duration indicates a number of consecutive slots $T_s$ that the search space lasts (or exists) in every occasion (PDCCH occasion, PDCCH monitoring occasion).

The RRC parameter may include aggregationLevel1, aggregationLevel2, aggregationLevel4, aggregationLevel8, aggregationLevel16. The RRC parameter nrofCandidates may provide a number of PDCCH candidates per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, for CCE aggregation level 8, and CCE aggregation level 16, respectively. In other words, the value L can be set to either one in the set {1, 2, 4, 8,16}. The number of PDCCH candidates per CCE aggregation level L can be configured as 0, 1, 2, 3, 4, 5, 6, or 8. For example, in a case the number of PDCCH candidates per CCE aggregation level L is configured as 0, the UE may not search for PDCCH candidates for CCE aggregation L. That is, in this case, the UE may not monitor PDCCH candidates for CCE aggregation L of a search space set s. For example, the number of PDCCH candidates per CCE aggregation level L is configured as 4, the UE may monitor 4 PDCCH candidates for CCE aggregation level L of a search space set s.

The RRC parameter searchSpaceType is used to indicate that the search space set s is either a CSS set or a USS set. The RRC parameter searchSpaceType may include either a common or a ue-Specific. The RRC parameter common configure the search space set s as a CSS set and DCI format to monitor. The RRC parameter ue-Specific configures the search space set s as a USS set. The RRC parameter ue-Specific may include dci-Formats. The RRC parameter dci-Formats indicates to monitor PDCCH candidates either for DCI format 0_0 and DCI format 10, or for DCI format 0_1 and DCI format 1_1 in search space set s. That is, the RRC parameter searchSpaceType indicates whether the search space set s is a CSS set or a USS set as well as DCI formats to monitor for. The RRC parameter ue-Specific may further include a new RRC parameter (e.g. dci-FormatsExt) in addition to the dci-Formats. The RRC parameter dci-FormatsExt indicates to monitor PDCCH candidates for DCI format 0_2 and DCI format 1_2, or for DCI format 0_1, DCI format 1_1, DCI format 0_2 and DCI format 1_2. If the RRC parameter dci-FormatsExt is included in the RRC parameter ue-Specific, the UE may ignore the RRC parameter dci-Formats. That is to say, the UE may not monitor the PDCCH candidates for DCI formats indicated by the RRC parameter dci-Format, and may monitor the PDCCH candidates for DCI formats indicated by the RRC parameter dci-FormatsExt.

The UE 102 may monitor PDCCH candidates for DCI format 0_0 and/or DCI format 1_0 in either a CSS or a USS. The UE 102 may monitor PDCCH candidates for DCI format 0_1, DCI format 1_1, DCI format 0_2 and/or DCI format 1_2 only in a USS but cannot monitor PDCCH candidates for DCI format 0_1, DCI format 1_1, DCI format 0_2, and/or DCI format 1_2 in a CSS. The DCI format 0_1 may schedule up to two transport blocks for one PUSCH while the DCI format 0_2 may only schedule one transport blocks for one PUSCH. DCI format 0_2 may not consist of some fields (e.g. 'CBG transmission information' field), which may be present in DCI format 0_1. Similarly, the DCI format 1_1 may schedule up to two transport blocks for one PDSCH while the DCI format 12 may only schedule one transport blocks for one PDSCH. DCI format 1_2 may not consist of some fields (e.g., 'CBG transmission information' field), which may be present in DCI format 1_1. The DCI format 1_2 and DCI format 1_1 may consist of one or more same DCI fields (e.g., 'antenna port' field).

The base station 160 may schedule a UE 102 to receive PDSCH by a downlink control information (DCI). A DCI format provides DCI and includes one or more DCI fields. The one or more DCI fields in a DCI format are mapped to the information bits. As above-mentioned, the UE 102 can be configured by the base station 160 one or more search space sets to monitor PDCCH for detecting corresponding DCI formats. If the UE 102 detects a DCI format (e.g., the DCI format 1_0, the DCI format 1_1, or the DCI format 1_2) in a PDCCH, the UE 102 may be scheduled by the DCI format to receive a PDSCH.

A USS at CCE aggregation level L is defined by a set of PDCCH candidates for CCE aggregation L. A USS set may be constructed by a plurality of USS corresponding to respective CCE aggregation level L. A USS set may include one or more USS(s) corresponding to respective CCE aggregation level L. A CSS at CCE aggregation level L is defined by a set of PDCCH candidates for CCE aggregation L. A CSS set may be constructed by a plurality of USS corresponding to respective CCE aggregation level L. A CSS set may include one or more CSS(s) corresponding to respective CCE aggregation level L.

Herein, 'a UE monitor PDCCH for a search space set s' also refers to 'a UE may monitor a set of PDCCH candidates of the search space set s'. Alternatively, 'a UE monitor PDCCH for a search space set s' also refers to 'a UE may attempt to decode each PDCCH candidate of the search space set s according to the monitored DCI formats'. As above-mentioned, the PDCCH is used for transmitting or carrying Downlink Control Information (DCI). Thus, 'PDCCH', 'DCI format', and/or 'PDCCH candidate' are virtually interchangeable. In other words, 'a UE monitors PDCCH' implies 'a UE monitors PDCCH for a DCI format'. That is, 'a UE monitors PDCCH' implies 'a UE monitors PDCCH for detection of a configured DCI format'.

In the present disclosure, the term "PDCCH search space sets" may also refer to "PDCCH search space". A UE monitors PDCCH candidates in one or more of search space sets. A search space sets can be a common search space (CSS) set or a UE-specific search space (USS) set. In some implementations, a CSS set may be shared/configured among multiple UEs. The multiple UEs may search PDCCH candidates in the CSS set. In some implementations, a USS set is configured for a specific UE. The UE may search one or more PDCCH candidates in the USS set. In some implementations, a USS set may be at least derived from a value of C-RNTI addressed to a UE.

An illustration of CORESET configuration is described below.

A base station may configure a UE one or more CORESETs for each DL BWP in a serving cell. For example, a RRC parameter ControlResourceSetZero is used to configure CORESET 0 of an initial DL BWP. The RRC parameter ControlResourceSetZero corresponds to 4 bits. The base station may transmit ControlResourceSetZero, which may be included in MIB or RRC parameter ServingCellConfigCommon, to the UE. MIB may include the system information transmitted on BCH(PBCH). A RRC parameter related to initial DL BWP configuration may also include the RRC parameter ControlResourceSetZero. RRC parameter ServingCellConfigCommon is used to configure cell specific parameters of a UE's serving cell and contains parameters which a UE would typically acquire from SSB, MIB or SIBs when accessing the cell form IDLE.

Additionally, a RRC parameter ControlResourceSet is used to configure a time and frequency CORESET other than CORESET 0. The RRC parameter ControlResourceSet may include a plurality of RRC parameters such as, ControlResourceSetId, frequencyDomainResource, duration, cce-REG-MappingType, precoderGranularity, tci-PresentInDCI, pdcch-DMRS-ScramblingID and so on.

Here, the RRC parameter ControlResourceSead is an CORESET index p, used to identify a CORESET within a serving cell, where 0<p<12. The RRC parameter duration indicates a number of consecutive symbols of the CORESET $N_{symb}^{CORESET}$, which can be configured as 1, 2 or 3 symbols. A CORESET consists of a set of $N_{RB}^{CORESET}$ resource blocks (RBs) in the frequency domain and $N_{symb}^{CORESET}$ symbols in the time domain. The RRC parameter frequencyDomainResource indicates the set of $N_{RB}^{CORESET}$ RBs for the CORESET. Each bit in the frequencyDomainResource corresponds a group of 6 RBs, with grouping starting from the first RB group in the BWP. The first (left-most/most significant) bit corresponds to the first RB group in the BWP, and so on. The first common RB of the first RB group has common RB index 6×ceiling $(N_{BWP}^{start}/6)$ A bit that is set to 1 indicates that this RB group belongs to the frequency domain resource of this CORESET. Bits corresponding to a group of RBs not fully contained in the bandwidth part within which the CORESET is configured are set to zero. The ceiling(A) function hereinafter is to output a smallest integer not less than A.

According to the CORESET configuration, a CORESET (a CORESET 0 or a CORESET p) consists of a set of PRBs with a time duration of 1 to 3 OFDM symbols. The resource units Resource Element Groups (REGs) and Control Channel Elements (CCEs) are defined within a CORESET. A CCE consists of 6 REGs where a REG equals one resource block during one OFDM symbol. Control channels are formed by aggregation of CCE. That is, a PDCCH consists of one or more CCEs. Different code rates for the control channels are realized by aggregating different number of CCE. Interleaved and non-interleaved CCE-to-REG mapping are supported in a CORESET. Each resource element group carrying PDCCH carries its own DMRS.

Figure 4:
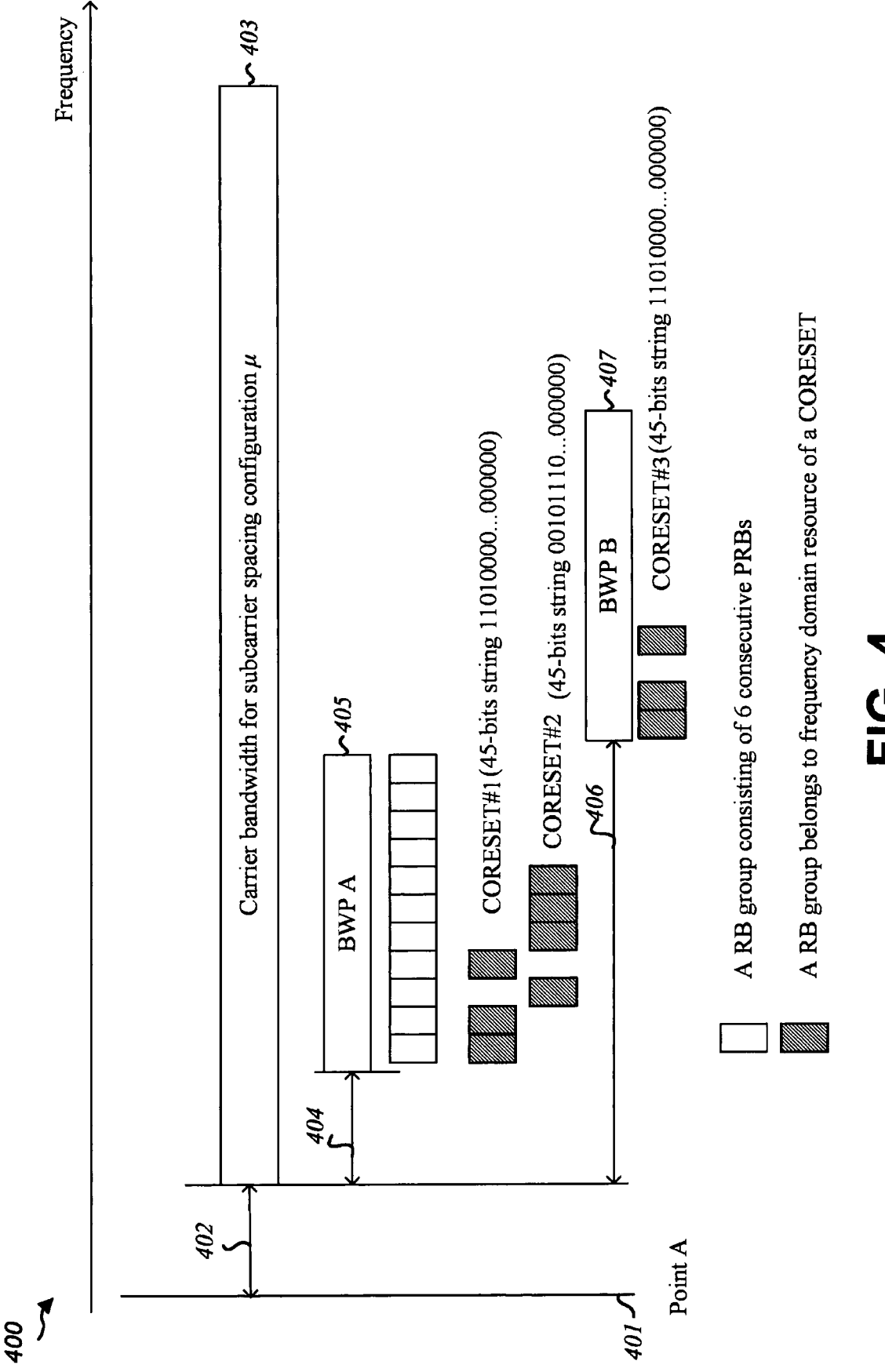
FIG. 4 is a diagram illustrating one 400 example of CORESET configuration in a BWP by a UE 102 and a base station 160.

FIG. 4 is a diagram illustrating one 400 example of CORESET configuration in a BWP by a UE 102 and a base station 160.

FIG. 4 illustrates that a UE 102 is configured with three CORESETs for receiving PDCCH transmission in two BWPs. In the FIG. 4, 401 represent point A. 402 is an offset in frequency domain between point A 401 and a lowest usable subcarrier on the carrier 403 in number of CRBs, and the offset 402 is given by the offsetToCarrier in the SCS-SpecificCarrier IE. The BWP 405 with index A and the carrier 403 are for a same subcarrier spacing configuration μ. The offset 404 between the lowest CRB of the carrier and the lowest CRB of the BWP in number of RBs is given by the locationAndBandwidth included in the BWP configuration for BWP A. The BWP 407 with index B and the carrier 403 are for a same subcarrier spacing configuration μ. The offset 406 between the lowest CRB of the carrier and the lowest CRB of the BWP in number of RBs is given by the locationAndBandwidth included in the BWP configuration for BWP B.

For the BWP 405, two CORESETs are configured. As above-mentioned, a RRC parameter frequencyDomainResource in respective CORESET configuration indicates the frequency domain resource for respective CORESET. In the frequency domain, a CORESET is defined in multiples of RB groups and each RB group consists of 6 RBs. For example, in the FIG. 4, the RRC parameter frequencyDomainResource provides a bit string with a fixed size (e.g. 45 bits) as like '11010000 . . . 000000' for CORESET #1. That is, the first RB group, the second RB group, and the fourth RB group belong to the frequency domain resource of the CORESET #1. Additionally, the RRC parameter frequencyDomainResource provides a bit string with a fixed size (e.g. 45 bits) as like '00101110 . . . 000000' for CORESET #2. That is, the third RB group, the fifth RB group, the sixth RB group and the seventh RB group belong to the frequency domain resource of the CORESET #2.

For the BWP 407, one CORESET is configured. As above-mentioned, a RRC parameter frequencyDomainResource in the CORESET configuration indicates the frequency domain resource for the CORESET #3. In the frequency domain, a CORESET is defined in multiples of RB groups and each RB group consists of 6 RBs. For example, in the FIG. 4, the RRC parameter frequencyDomainResource provides a bit string with a fixed size (e.g. 45 bits) as like '11010000 . . . 000000' for CORESET #3. That is, the first RB group, the second RB group, and the fourth RB group belong to the frequency domain resource of the CORESET #3. Although the bit string configured for CORESET #3 is same as that for CORESET #1, the first RB group of the BWP B is different from that of the BWP A in the carrier. Therefore, the frequency domain resource of the CORESET #3 in the carrier is different from that of the CORESET #1 as well.

Hereinafter, PUSCH configuration and DMRS configuration are described.

The base station 160 may transmit, to the UE 102, a PDCCH with a DCI format. A PUSCH is scheduled by the DCI format. Upon detection of the PDCCH with a DCI format carrying DCI, the UE 102 may be scheduled to transmit PUSCH scheduled by the DCI (DCI format) in the PDCCH. The UE 102 may derive, based on the DCI (DCI fields of the DCI format), necessary information for transmission of the PUSCH. For example, the UE 102 may determine, at least based on a time domain resource assignment field, one, more, or all of a starting slot, time domain resource allocation, PUSCH mapping type, a PUSCH repetition number, and so on. The starting slot means a slot where the PUSCH is transmitted by the UE 102. If the UE 102 is configured with PUSCH repetition transmission, the starting slot means a slot where the first repetition of the PUSCH transmission is transmitted by the UE 102.

The time domain resource allocation means a starting symbol of the allocated PUSCH and a duration of the allocated PUSCH. To be more specific, the UE 102 may at least determine, based on a time domain resource assignment filed of the DCI format, a starting symbol S and a number of consecutive symbols L of the PUSCH transmission in the time domain. The number of consecutive symbols L counts from the starting symbol S within the starting slot. The resource allocation allocated for a PUSCH transmission in time domain may refer to as a PUSCH transmission occasion allocated for a PUSCH transmission or as a scheduled PUSCH resource. The PUSCH transmission occasion (or the scheduled PUSCH resource) comprises at least a starting symbol S, and a number of consecutive symbols L counting from the starting symbol S within a slot. In other words, the base station 160 may receive, from the UE 102, the PUSCH in the PUSCH transmission occasion. And the UE 102 may transmit, to a base station 160, the PUSCH in the PUSCH transmission occasion.

There are two PUSCH mapping types, i.e. one is PUSCH mapping type A and the other one is PUSCH mapping type B. The UE 102 may determine time location of the front-loaded DMRS symbol for the PUSCH depending on the PUSCH mapping type. In the present disclosure, the front-loaded DMRS symbol(s) for a PUSCH can be also referred to as the first DMRS symbol(s) for a PUSCH. Additional DMRS symbol(s) imply DMRS symbol(s) other than the front-loaded DMRS symbol for a PUSCH. Additional DMRS symbol(s) imply DMRS symbol(s) other than the first DMRS symbol for a PUSCH.

For PUSCH mapping type A, the front-loaded DMRS symbol (i.e. the first DMRS symbol) is in either a third symbol or a fourth symbol relative to the start of the slot where the PUSCH is transmitted. The base station 160 may use a parameter dmrs-TypeA-Position included in the MIB to indicate the position of the front-loaded DMRS symbol (i.e. the first DMRS symbol) to UEs who are camping on the serving cell. When the dmrs-TypeA-Position is set to 'pos2', the front-loaded DMRS symbol (i.e. the first DMRS symbol) for a PDSCH with PDSCH mapping type A or for a PUSCH with PUSCH mapping type A is in a third symbol relative to the start of the slot, i.e. the front-loaded DMRS symbol is in a third symbol of the slot. On the other hand, when the dmrs-TypeA-Position is set to 'pos3', the front-loaded DMRS symbol for a PDSCH with PDSCH mapping type A or for a PUSCH with PUSCH mapping type A is in a fourth symbol relative to the start of the slot, i.e. the front-loaded DMRS symbol for a PDSCH or PUSCH is in a fourth symbol of the slot. For PUSCH mapping type A, a PUSCH with allocation duration L ranging from 4 symbols to 14 symbols can be scheduled. While the starting symbol S of a PUSCH with PUSCH mapping type A can be scheduled in the first symbol in a slot.

For PUSCH mapping type B, the front-loaded DMRS symbol (i.e. the first DMRS symbol) may always be in the first symbol of the scheduled PUSCH resources. That is to say, the front-loaded (first) DMRS symbol for a PUSCH with PUSCH mapping type B is in a first symbol of the PUSCH. For PUSCH mapping type B, a PUSCH with allocation duration L ranging from 1 symbols to 14 symbols can be scheduled. While the starting symbol S of a PUSCH with PUSCH mapping type B can be scheduled in any of symbols in a slot.

In the present disclosure, the base station may configure different DMRS configurations for PUSCH mapping type A and PUSCH mapping type B via RRC parameters.

A RRC parameter dmrs-DownlinkForPUSCH-MappingTypeA is used for DMRS configuration for PUSCH with PUSCH mapping type A. A RRC parameter dmrs-DownlinkForPUSCH-MappingTypeB is used for DMRS configuration for PUSCH with PUSCH mapping type B. Each of the RRC parameter dmrs-DownlinkForPUSCH-MappingTypeA and the RRC parameter dmrs-DownlinkForPUSCH-MappingTypeB may contain fields as like dmrs-Type, dmrs-AdditinalPosition, maxlength, and so on. The fields dmrs-Type, dmrs-AdditionalPosition, and maxlength may be set differently for the dmrs-DownlinkForPUSCH-MappingTypeA and the dmrs-DownlinkForPUSCH-MappingTypeB. Additionally or alternatively, the fields dmrs-Type, dmrs-AdditionalPosition, and maxlength can be also set same for the dmrs-DownlinkForPUSCH-MappingTypeA and the dmrs-DownlinkForPUSCH-MappingTypeB.

The RRC parameter dmrs-Type is used for selection of the DMRS configuration type for uplink. In the present disclosure, two DMRS configuration types i.e. DMRS configuration type 1 and DMRS configuration type 2 are used. To be specific, if the dmrs-Type is not configured (i.e. the dmrs-Type is absent), the UE 102 uses DMRS configuration type 1. On the other hand, if the RRC parameter dmrs-Type is configured, the UE 102 uses DMRS configuration type 2. The difference between the DMRS configuration type 1 and the DMRS configuration type 2 is different densities in the frequency domain. The resource elements used for DMRS configuration type 1 per RB is denser than that used for DMRS configuration type 2 per RB in the frequency domain.

The RRC parameter dmrs-AdditinalPosition, which can be set to 'pos0', 'pos1', or 'pos3' by the base station 160, is used to indicate the position of additional DMRS symbol(s) for PUSCH. If the dmrs-AdditinalPosition is not configured (i.e. the dmrs-AdditinalPosition is absent), the LT determines the value of the dmrs-AdditinalPosition is set to 'pos2'. If dmrs-AdditinalPosition is set to 'pos0', there are no additional DMRS present for a PUSCH. If dmrs-AdditinalPosition is set to 'pos1', there are up to one additional DMRS present for a PUSCH depending on the allocation duration of the PUSCH. If dmrs-AdditinalPosition is set to 'pos2', there are up to two additional DMRS present for a PUSCH depending on the allocation duration of the PUSCH. If dmrs-AdditinalPosition is set to 'pos3', there are up to three additional DMRS present for a PUSCH depending on the allocation duration of the PUSCH.

The RRC parameter maxlengh is used to indicate the maximum number of OFDM symbols for UL front-loaded DMRS. The maxlength can be configured to 'len2' by the base station 160. That is, the UE 102 may determine the front-loaded DMRS is double-symbol front-loaded DMRS. Specifically, in the case that maxlength is configured to set to 'len2', the UE 102 may determine the front-loaded DMRS is single-symbol front-loaded DMRS or double-symbol front-loaded DMRS based on the associated DCI. On the other hand, if the maxlength is not configured (i.e. the maxlength is absent), the UE 102 determines that the maxlength is set to 'len1'. That is, the UE may determine the front-loaded DMRS is single-symbol front-loaded DMRS. Double-symbol front loaded DMRS means front-loaded DMRS with 2 consecutive OFDM symbols. Single-symbol front-loaded DMRS means front-loaded DMRS with 1 OFDM symbol. Both the DMRS configuration type 1 and DMRS configuration type 2 can support the single-symbol front-loaded DMRS and the double-symbol front-loaded DMRS.

Figure 5:
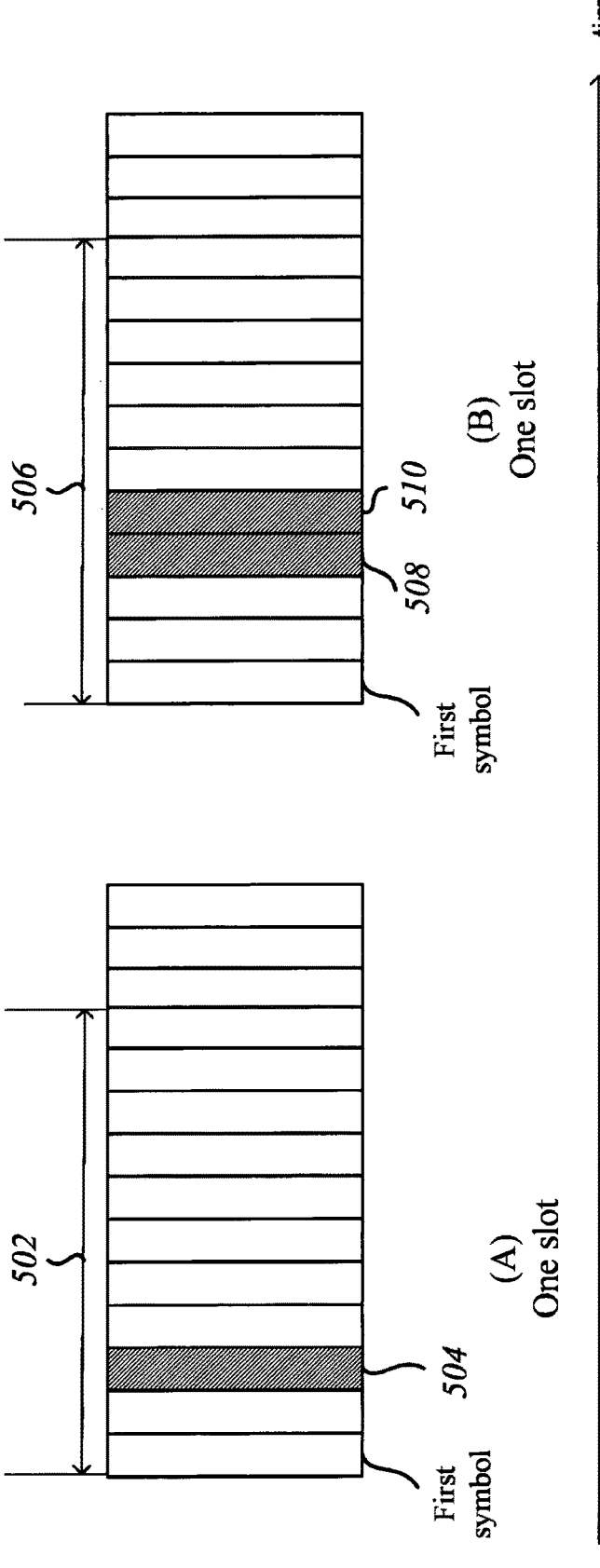
FIG. 5 is a diagram illustrating one example 500 of DMRS configuration for a PUSCH with PUSCH mapping type A.

FIG. 5 is a diagram illustrating one example 500 of DMRS configuration for a PUSCH with PUSCH mapping type A. PUSCH mapping type for PUSCHs illustrated in the FIG. 5 is provided as PUSCH mapping type A by the corresponding DCI formats which scheduled the PUSCHs in the FIG. 5, respectively.

FIG. 5(A) is an illustration where the RRC parameter dmrs-TypeA-Position is set to 'pos2' and single-symbol front-loaded DMRS is configured. RRC parameter dmrs-AdditinalPosition is set to 'pos0', i.e. there are no additional DMRS present for the PUSCH. In FIG. 5(A), the UE 102 is scheduled with a PUSCH with allocated resource 502 with PUSCH mapping type A. The position of the single-symbol front-loaded DMRS with one OFDM symbol 504 is in the third symbol relative to the start of the slot, which is indicated by the dmrs-TypeA-Position. The starting symbol S of the PUSCH with allocated resource 502 is in the first symbol of the slot, and the allocation duration L of the PUSCH with allocated resource 502 is 11 OFDM symbols.

FIG. 5(B) is an illustration where the RRC parameter dmrs-TypeA-Position is set to 'pos3' and double-symbol front-loaded DMRS is configured. RRC parameter dmrs-AdditinalPosition is set to 'pos0', i.e. there are no additional DMRS present for the PUSCH. In FIG. 5(B), the UE 102 is scheduled with a PUSCH with allocated resource 506 with PUSCH mapping type A. The double-symbol front-loaded DMRS is with two consecutive OFDM symbols. The position of the first symbol 508 of the double-symbol front-loaded DMRS is in the fourth symbol relative to the start of the slot, which is indicated by the dmrs-TypeA-Position. The position of the second symbol 510 of the double-symbol front-loaded DMRS is in the fifth symbol relative to the start of the slot. The starting symbol S of the PUSCH with allocated resource 506 is in the first symbol of the slot, and the allocation duration L of the PUSCH with allocated resource 502 is 11 OFDM symbols.

Figure 6:
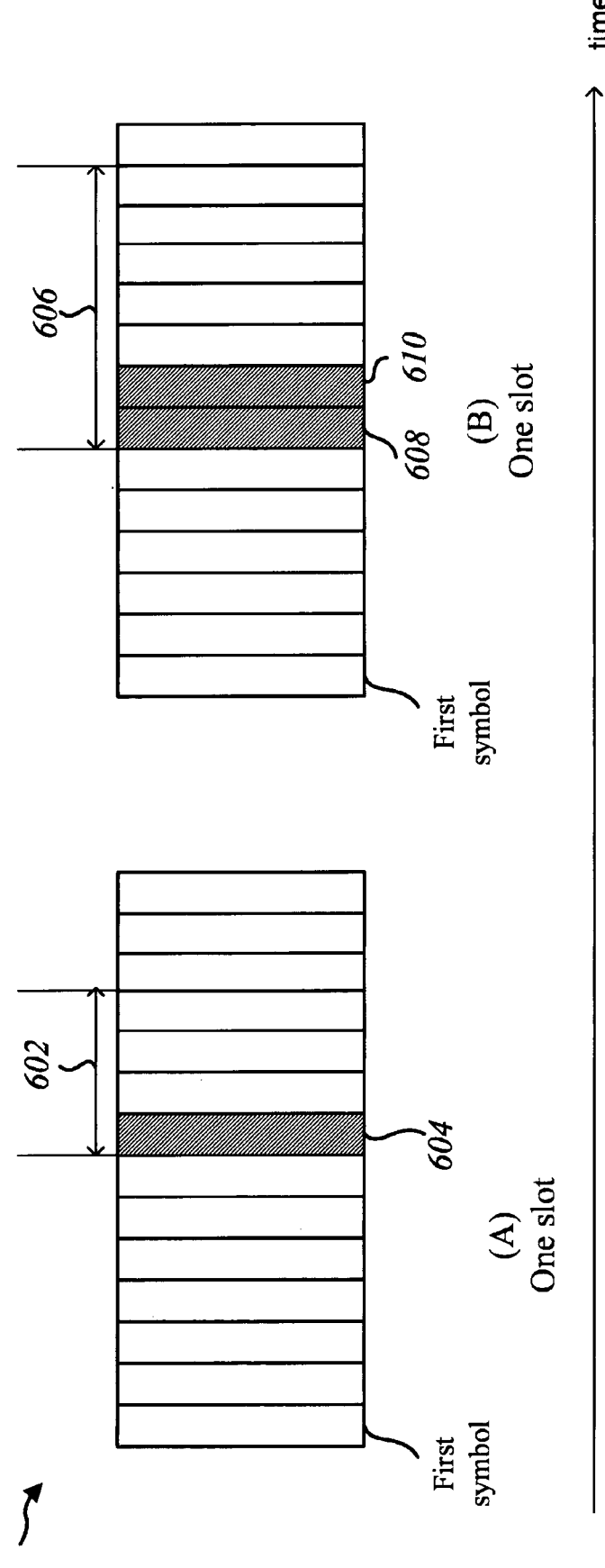
FIG. 6 is a diagram illustrating one example 600 of DMRS configuration for a PUSCH with PUSCH mapping type B.

FIG. 6 is a diagram illustrating one example 600 of DMRS configuration for a PUSCH with PUSCH mapping type B. PUSCH mapping type for PUSCHs illustrated in the FIG. 6 is provided as PUSCH mapping type B by the corresponding DCI formats which scheduled the PUSCHs in the FIG. 6, respectively.

FIG. 6(A) is an illustration where single-symbol front-loaded DMRS is configured. RRC parameter dmrs-AdditinalPosition is set to 'pos0', i.e. there are no additional DMRS present for the PUSCH with mapping type B. In FIG. 6 (A), the UE 102 is scheduled with a PUSCH with allocated resource 602 with PUSCH mapping type B. The starting symbol S of the PUSCH with allocated resource 602 is in the eighth symbol of the slot, and the allocation duration L of the PUSCH with allocated resource 602 is 4 OFDM symbols. The position of the single-symbol front-loaded DMRS with one OFDM symbol 604 is in the eighth symbol, which is the first symbol of the allocated PUSCH resource 602.

FIG. 6(B) is an illustration where double-symbol front-loaded DMRS is configured. RRC parameter dmrs-AdditinalPosition is set to 'pos0', i.e. there are no additional DMRS present for the PUSCH with mapping type B. In FIG. 6 (B), the UE 102 is scheduled with a PUSCH with allocated resource 606 with PUSCH mapping type B. The starting symbol S of the PUSCH with allocated resource 606 is in the seventh symbol of the slot, and the allocation duration L of the PUSCH with allocated resource 502 is 7 OFDM symbols. The double-symbol front-loaded DMRS is with two consecutive OFDM symbols. The position of the first symbol 608 of the double-symbol front-loaded DMRS is in the seventh symbol, which is the first symbol of the allocated PUSCH resource 606. The position of the second symbol 610 of the double-symbol front-loaded DMRS is in the eighth symbol relative to the start of the slot.

In the present disclosure, the UE 102 may be configured with either of the RRC parameters dmrs-DownlinkFor-PUSCH-MappingTypeA and dmrs-DownlinkForPUSCH-MappingTypeB or both the RRC parameters dmrs-DownlinkForPUSCH-MappingTypeA and dmrs-DownlinkForPUSCH-MappingTypeB.

As above-mentioned, the UE 102 may receive a PDCCH with a DCI format. Upon detection of the PDCCH with the DCI format, the UE 102 may determine the PUSCH mapping type for the scheduled PUSCH. In a case that the scheduled PUSCH is with PUSCH mapping type A, the UE 102 may use the DMRS configuration configured by the RRC parameter dmrs-DownlinkForPUSCH-MappingTypeA for transmitting the scheduled PUSCH. In a case that the scheduled PUSCH is with PUSCH mapping type B, the UE 102 may use the DMRS configuration configured by the RRC parameter dmrs-DownlinkForPUSCH-MappingTypeB for transmitting the scheduled PUSCH.

Communication with service traffic type like (but not limited to) URLLC may require a much stricter reliability. In the present disclosure, repetition transmission can be applied to uplink channel, for example, PUSCH. Repetition can improve coverage and reliability. By repeating the PUSCH transmission in time domain, more resources are used for transmission of the PUSCH and the soft-combination of the repeated PUSCH results in a lower code rate of the PUSCH, which eventually improve reception performance of the PUSCH. Moreover, existing channel inference on an antenna port for a PUSCH transmission cannot adapt URLLC communication features. Introduction of channel inference on an antenna port for a PUSCH transmission other than the existing one would be beneficial and efficient for communication with a new service traffic type like URLLC between based station(s) and UE(s). In order to implement communication feature with different service traffic types, different channel inference methods may be applied according to different service traffic types.

In the present disclosure, there are two PUSCH repetition types, i.e. PUSCH repetition Type A and PUSCH repetition Type B, applicable for PUSCH transmission. That is, there are two PUSCH repetition procedures, i.e. PUSCH repetition Type A procedure and PUSCH repetition Type B procedure, applicable for PUSCH transmission.

The base station 160 may indicate the UE 102 which PUSCH repetition procedure is applied to a PUSCH transmission via a RRC parameter. The RRC parameter is specific to a DCI format. If the UE 102 is configured to monitor both DCI format 0_1 and DCI format 0_2, the base station may provide the UE 102 two RRC parameters pusch-RepTypeIndicatorDCI-0-1 and punch-RepTypeIndicatorDCI-0-2. The pusch-RepTypeIndicatorDCI-0-1 is used to indicate UE which PUSCH repetition procedure is applied to a PUSCH transmission scheduled by DCI format 0_1. Similarly, the pusch-RepTypeIndicatorDCI-0-2 is used to indicate UE which PUSCH repetition procedure is applied to a PUSCH transmission scheduled by DCI format 0_2.

The RRC parameters pusch-RepTypeIndicatorDCI-0-1 and pusch-RepTypeIndicatorDCI-0-2 can be set to either 'pusch-RepTypeA' or 'pusch-RepTypeB'. To be specific, when the pusch-RepTypeIndicatorDCI-0-1 is set to 'pusch-RepTypeA', the UE 102 may determine the PUSCH repetition Type A procedure is applied to a PUSCH transmission scheduled by DCI format 0_1. On the other hand, when thepusch-RepTypeIndicatorDCI-0-1 is set to 'pusch-RepTypeB', the UE 102 may determine the PUSCH repetition Type B procedure is applied to a PUSCH transmission scheduled by DCI format 0_1. Similarly, when the pusch-RepTypeIndicatorDCI-0-2 is set to 'pusch-RepTypeA', the UE 102 may determine the PUSCH repetition Type A procedure is applied to a PUSCH transmission scheduled by DCI format 0_2. On the other hand, when the pusch-RepTypeIndicatorDCI-0-2 is set to 'pusch-RepTypeB', the UE 102 may determine the PUSCH repetition Type B procedure is applied to a PUSCH transmission scheduled by DCI format 0_2.

The base station 102 may transmit to the UE 102, a PDCCH with a first DCI format scheduling a PUSCH transmission. Upon detection of the PDCCH with the first DCI format, the UE 102 is scheduled to transmit a transport block on PUSCH. A PUSCH transmission may refer to a PUSCH transmission of a transport block. A PUSCH transmission with repetition(s) may refer to a same transport block repetition(s) on a PUSCH. A PUSCH transmission with repetition(s) may refer to one or multiple repetitions of a PUSCH for a transport block.

The number of repetitions to be applied to the transmitted transport block can be 1, 2, 4, 8, 16, etc. However, in the present disclosure, a PUSCH transmission with repetition number 1 does not mean more than PUSCH transmission of a transport block. The PUSCH transmission with repetition number 1 may mean one PUSCH transmission (one PUSCH repetition) of a transport block. In other words, a PUSCH transmission with repetition number 1 may not mean two PUSCH transmissions, for example, one initial PUSCH transmission of a transport block and one PUSCH retransmission of the same transport block. That is, a PUSCH transmission with repetition number 1 may means one PUSCH transmission, for example, an initial PUSCH transmission (i.e. an initial transmission of a transport block, an initial PUSCH transmission of a transport block, or a transport block in an initial PUSCH transmission). One transmission of a transport block can refer to one PUSCH repetition of the transport block.

Upon detection of the PDCCH with the first DCI format scheduling a PUSCH transmission, the UE 102 determine, at least based on a time domain resource assignment filed of the first DCI format, a starting symbol S and a number of consecutive symbols L of the PUSCH transmission in the time domain. The starting symbol S is relative to the start of a slot. The slot where PUSCH is transmitted is indicated by the first DCI format. The number of consecutive symbols L counts from the starting symbol S within the slot. The resource allocation allocated for a PUSCH transmission in time domain may refer to as a PUSCH transmission occasion allocated for a PUSCH transmission or as a scheduled PUSCH resource. In other words, the UE 102 may transmit, to the base station 160, the PUSCH in one or more PUSCH transmission occasions. And the base station 160 may receive, from the UE 102, the PUSCH in the one or more PUSCH transmission occasions.

Hereinafter, illustration of PUSCH repetition Type A procedure is described.

For PUSCH repetition Type A, the number of repetitions K is determined based on a RRC parameter numberOfRepetitions, a RRC parameter pusch-AggregationFactor. If the numberOfRepetitions is present in the resource allocation table, the number of repetitions K is equal to a value indicated by the numberOfRepetitions. If the numberOfRepetitions is not present in the resource allocation table and if the UE is configured with pusch-AggregationFactor, the number of repetitions K is equal to a value indicated by the pusch-AggregationFactor. If the numberOfRepetitions is not present in the resource allocation table and if the UE is also not configured with pusch-AggregationFactor, the number of repetitions K is equal to 1.

Figure 7:
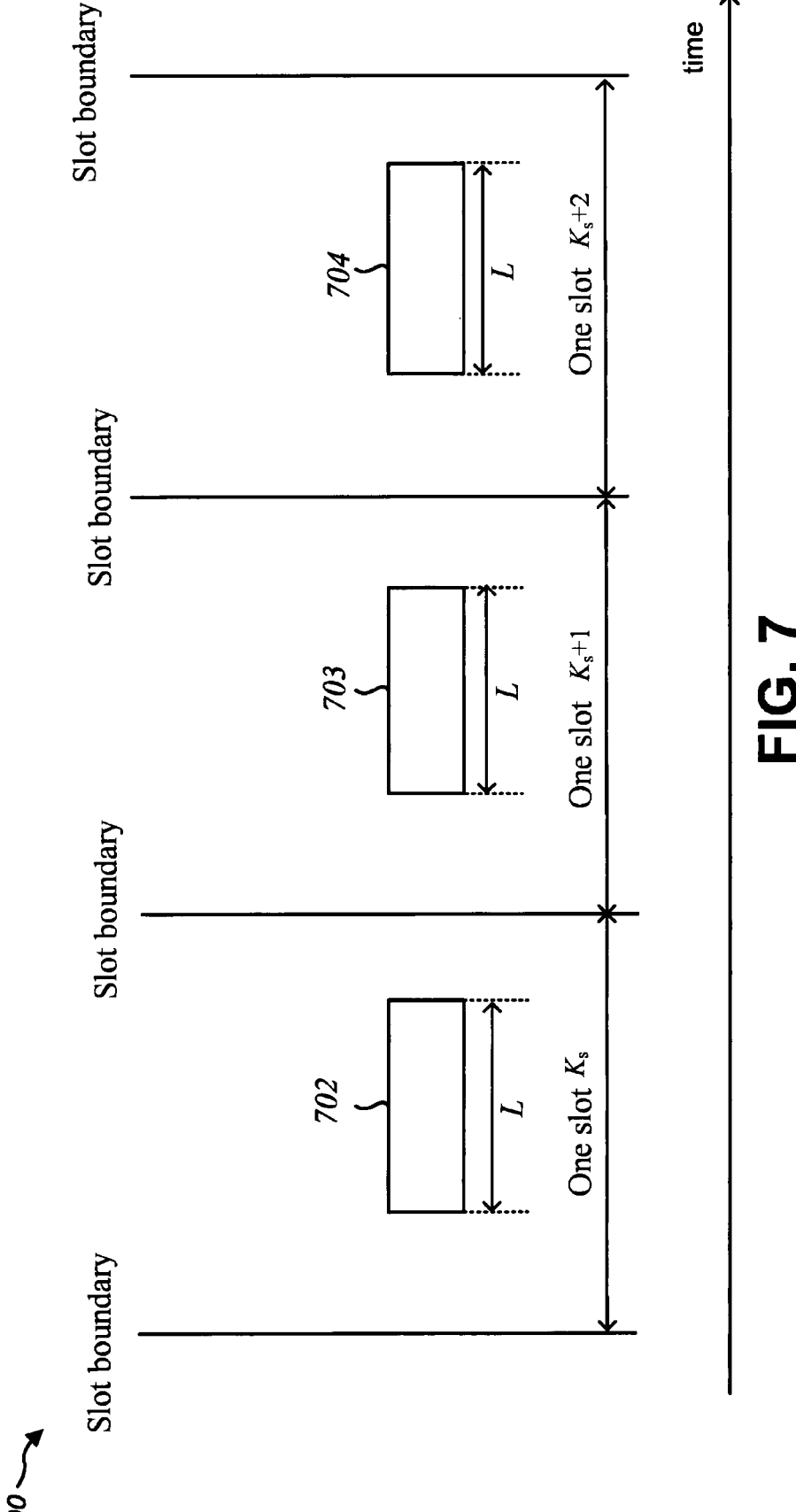
FIG. 7 is a diagram illustrating one example 700 of a PUSCH transmission with repetition Type A.

For PUSCH repetition Type A, in case K is larger than 1, the same symbol allocation is applied across the K consecutive slots. That is, the UE 102 may repeat a transport block across the K consecutive slots applying the same symbol allocation in each slot. FIG. 7 is a diagram illustrating one example 700 of a PUSCH transmission with repetition Type A.

Upon detection of the PDCCH with the first DCI format scheduling a PUSCH transmission with repetition Type A, the UE 102 determine, at least based on a time domain resource assignment filed, a symbol allocation including a starting symbol S and a number of consecutive symbols L of the PUSCH transmission in the time domain. The starting symbol S is relative to the start of a slot. In the FIG. 7, the starting symbol S is a fifth symbol of a slot. The number of consecutive symbols L is equal to 7. The number of repetition K is equal to 3. The UE 102 applies same symbol allocation, i.e. the starting symbol S and the number of consecutive symbols L, across 3 consecutive slots. The transmission occasions 701, 702, and 704 have same symbol allocation. That is, transmission occasions 702, 703, and 704 have a same starting symbol S relative to the start of respective slots and a same number of consecutive symbols L where L=7. The UE 102 may transmit a PUSCH of a TB in the transmission occasions 702, 703, and/or 704. First repetition of the PUSCH transmission with repetition Type A occurs in the transmission occasions 702. Second repetition of the PUSCH transmission with repetition Type A occurs in the transmission occasions 703. Third repetition of the PUSCH transmission with repetition Type A occurs in the transmission occasions 703.

Hereinafter, illustration of PUSCH repetition Type B procedure is described.

For PUSCH repetition Type B, the number of repetitions K is determined based on a RRC parameter numberOfRepetitions. That is, a resource allocation table applied to a PUSCH transmission with repetition Type B always provide the numberOfRepetitions. That is, the number of repetitions K is equal to a value indicated by the numberOfRepetitions. The number of repetitions provided by the numberOfRepetitions for PUSCH repetition Type B can be termed as number of nominal repetitions K.

Upon detection of the PDCCH with the first DCI format scheduling a PUSCH transmission with repetition Type B, the UE 102 determine, at least based on a time domain resource assignment filed, a symbol allocation including a starting symbol S and a number of consecutive symbols L of the PUSCH transmission in the time domain. The UE 102 may determine a slot K s where the PUSCH transmission with repetition Type B starts based on a DCI field of the first DCI format scheduling the PUSCH transmission with repetition Type B. The starting symbol S is relative to the start of the slot Ks.

For a n-th nominal repetition where n=0, 1, . . . , numberOfRepetitions−1, the UE 102 and/or the base station 160 may determine that, the slot where the n-th nominal repetition starts is given by $K_s$+floor$((S+n\times L)/N_{symb}^{slot})$; the starting symbol relative to the start of the slot is given by mod$((S+n\times L), N_{symb}^{slot})$; the slot where the n-th nominal repetition ends is given by $K_s$+floor$((S+(n+1)\times L-1)/N_{symb}^{slot})$; the starting symbol relative to the start of the slot is given by mod$((S+(n+1)\times L-1), N_{symb}^{slot})$. $N_{symb}^{slot}$ is the number of symbols per slot, for example, 14 symbols. Therefore, each nominal repetition has a same number of consecutive symbols L but may have a different starting symbol relative to respective slot(s). One or multiple nominal repetitions can occur in one slot. The total configured nominal repetitions K, where K can be 1 or other integer, can occur within one slot or across multiple slots. Symbol allocations for nominal repetitions are based on a back-to-back way. A (n+1)-th nominal repetition subsequently follows a n-th nominal repetition. The starting symbol of a (n+1)-th nominal repetition is a subsequent symbol of the last (ending) symbol of a n-th nominal repetition. A 0-th nominal repetition means a first nominal repetition, a 1-th nominal repetition means a second nominal repetition, and so on.

Figure 8:
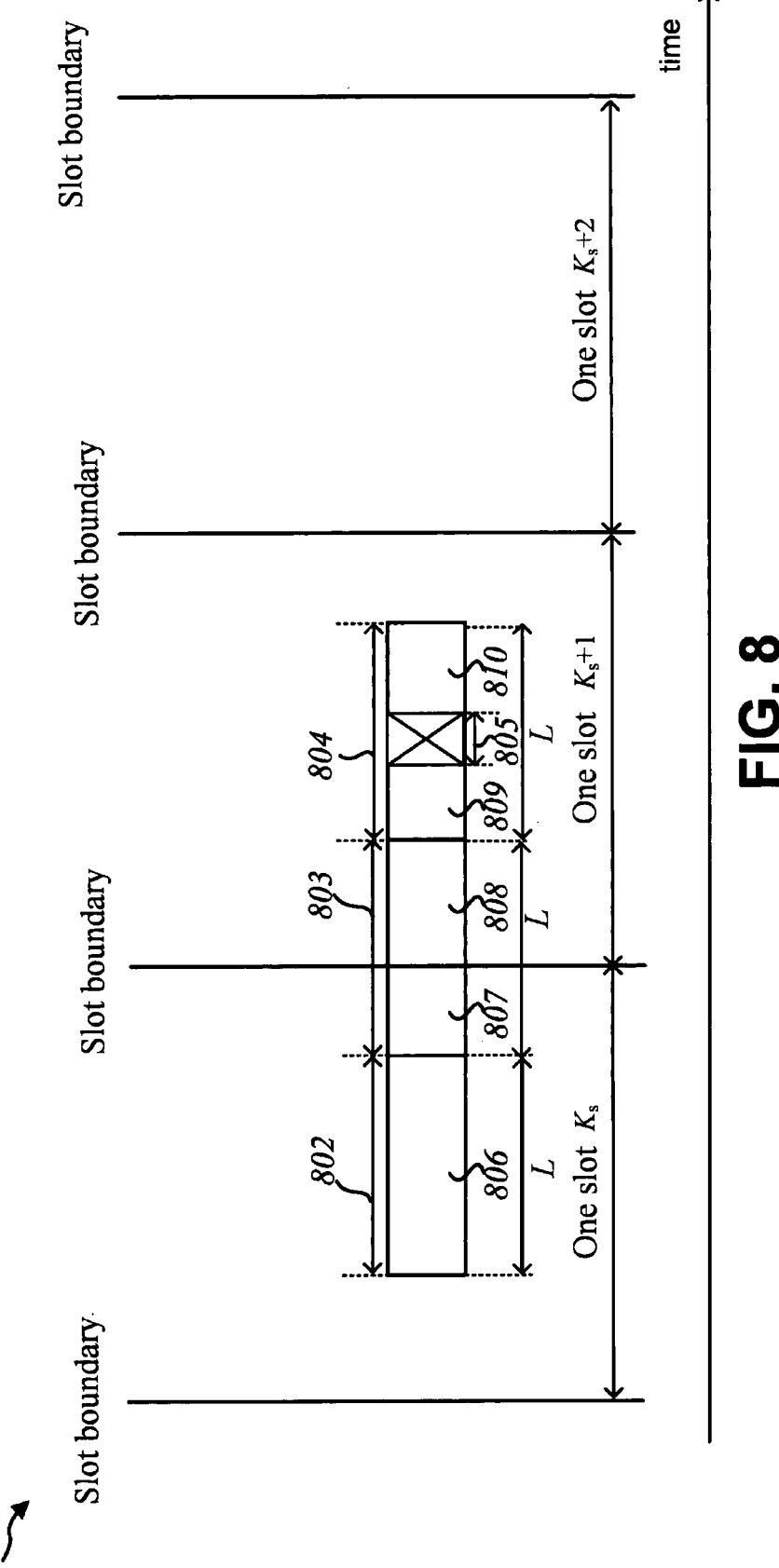
FIG. 8 is a diagram illustrating one example 800 of a PUSCH transmission with repetition Type B.

FIG. 8 is a diagram illustrating one example 800 of a PUSCH transmission with repetition Type B.

In the FIG. 8, the starting symbol S is a fifth symbol of a slot $K_s$. The number of consecutive symbols L is equal to 7. The number of nominal repetition K is equal to 3. The transmission occasions 802, 803, and 804 correspond to a first nominal repetition of the PUSCH 802, a second nominal repetition of the PUSCH 803, and a third nominal repetition of the PUSCH 804, respectively. Transmission occasions

802, 803, and 804 for respective nominal repetitions have a same number of consecutive symbols L, i.e. each nominal repetition of the PUSCH transmission with repetition Type B consists of a consecutive 7 symbols in the time domain. However, the starting symbol of each nominal repetition on corresponding transmission occasions 802, 803, and 804 may be different. The symbol allocation for the transmission occasion 802 of the first nominal repetition is given by the starting symbol S, the number of consecutive symbols L, and the slot K. That is, the starting symbol for the first nominal repetition 802 is the fifth symbol of the slot $K_s$. The starting symbol for the transmission occasion 803 of the second nominal repetition is a subsequent symbol of the ending symbol of the first nominal repetition (transmission occasion 802). That is, the starting symbol for the second nominal repetition 803 is the twelfth symbol of the slot $K_s$. The transmission occasion 803 of the second nominal repetition with 7 consecutive symbols crosses slot boundary. The starting symbol for the transmission occasion 804 of the third nominal repetition is a subsequent symbol of the ending symbol of the second nominal repetition (transmission occasion 803). That is, the starting symbol for the third nominal repetition 804 is the fifth symbol of the slot $K_s$+1.

For PUSCH repetition Type B, the UE 102 and/or the base station 160 may determine whether there are invalid symbol(s) present in each of the K nominal repetitions. The base station 160 may inform the UE 102 information associated with the invalid symbols via system information, RRC parameters, and/or DCI formats. For example, a symbol indicated as downlink by RRC parameters tdd-UL-DL-ConfiguratioCommon or tdd-UL-DL-ConfiguratioDedicated is determined as an invalid symbol for PUSCH repetition Type B. Symbols used for SS/PBCH blocks indicated by SIB1 are determined as invalid symbols for PUSCH repetition Type B. Additionally, the base station 160 may use a RRC parameter to indicate the UE 102 which symbol(s) are used as invalid symbol(s) for PUSCH repetition Type B.

As depicted in FIG. 8, symbol(s) 805 with duration 2 symbols are determined by the UE 102 as invalid symbols for PUSCH repetition Type B. After determining the invalid symbol(s) for PUSCH repetition Type B for each of the K nominal repetitions, the remaining symbols are considered as potentially valid symbols for PUSCH repetition Type B transmission. If the number of potentially valid symbols for PUSCH repetition Type B transmission is greater than zero for a nominal repetition, the nominal repetition consists of one or more actual repetitions, where each actual repetition consists of a consecutive set of all potentially valid symbols that can be used for PUSCH repetition Type B transmission within a slot. That is, each actual repetition is a set of consecutive symbols within a slot. In other words, an actual repetition cannot cross slot boundary.

Since no invalid symbol(s) are present in the first nominal repetition 802, the 1st nominal repetition consists of one actual repetition (the first actual repetition) 806. The first nominal repetition is same as the first actual repetition 806. There are no invalid symbol(s) present in the second nominal repetition 803 as well. Given each actual repetition consists of a consecutive set of all potentially valid symbols within a slot, the second nominal repetition, which crosses the slot boundary, consists of two actual repetitions, i.e. an actual repetition (the second actual repetition) 807 and an actual repetition (the third actual repetition) 808. The second actual repetition 807 within the second nominal repetition 802 starts from the twelfth symbol of the slot $K_s$ and ends on the slot boundary. The third actual repetition 808 within the second nominal repetition 802 starts from the first symbol of the slot $K_s+1$ and ends on the fourth symbol of the slot $K_s+1$.

Given there are invalid symbols 805 present in the third nominal repetition 804, the symbols of the third nominal repetition excluding the invalid symbols 805 are split into two actual repetitions. After determining the invalid symbols, the remaining symbols in the 804 are split into two sets of consecutive potentially valid symbols. That is, the third nominal repetition, which includes some invalid symbol(s), consists of two actual repetitions, i.e. an actual repetition (the fourth actual repetition) 809 and an actual repetition (the fifth actual repetition), 810.

If one nominal repetition is across the slot boundary or invalid symbol(s), the nominal repetition is split at the slot boundary or the invalid symbol(s) into multiple actual PUSCH repetitions. Therefore, the number of actual repetitions can be larger than the number of nominal repetitions. The UE 102 may repeat a transport block across actual repetitions.

Figure 9:
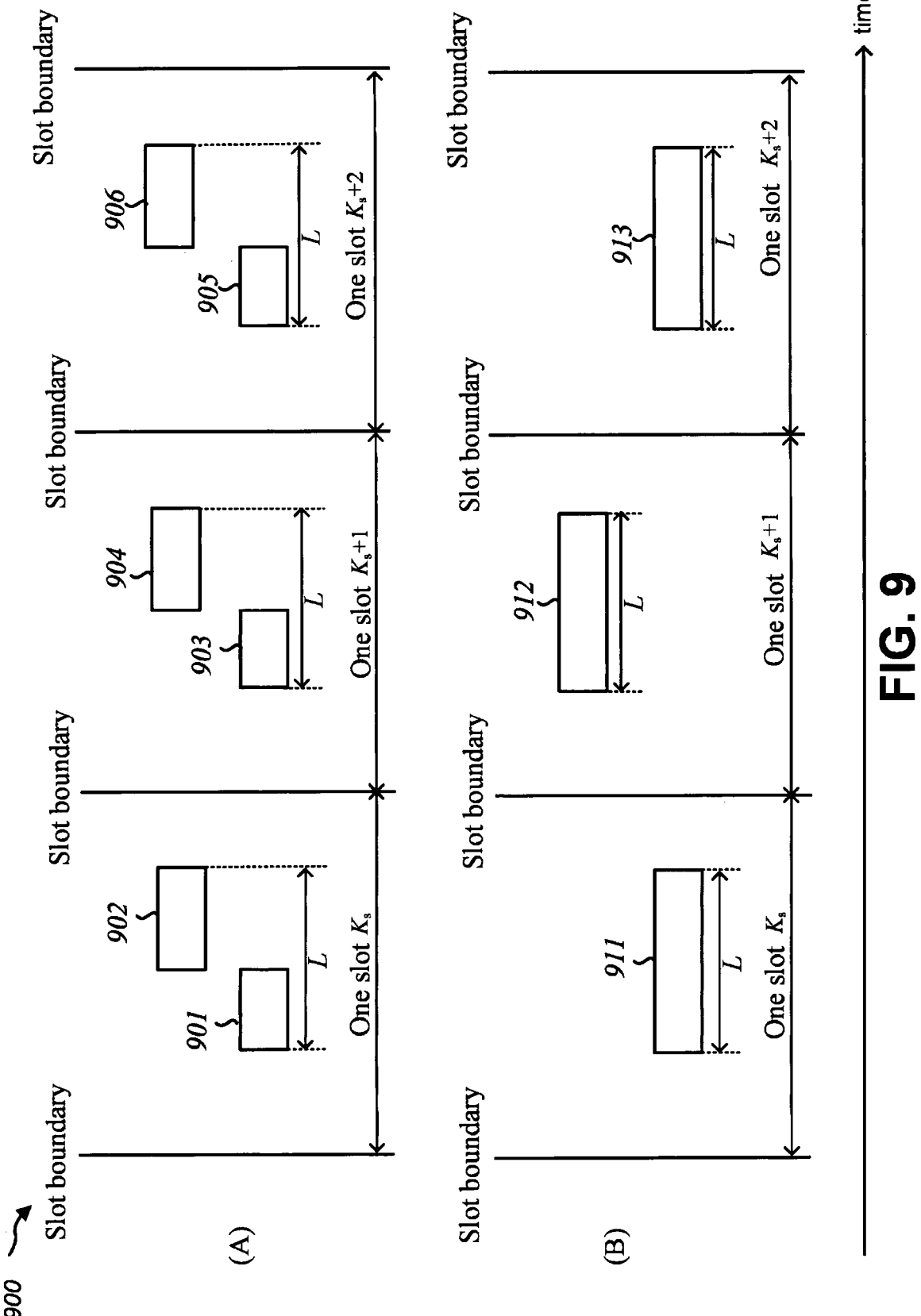
FIG. 9 is a diagram illustrating one example 900 of frequency hopping for a PUSCH transmission with repetition Type A.

FIG. 9 is a diagram illustrating one example 900 of frequency hopping for a PUSCH transmission with repetition Type A.

Two frequency hopping modes are defined for a PUSCH transmission with repetition Type A. One is intra-slot frequency hopping and the other one is inter-slot frequency hopping. The UE 102 can be configured one of the two frequency hopping modes by a RRC parameter for PUSCH repetition Type A. Upon detection of the PDCCH with a first DCI format, the UE 102 is scheduled with a PUSCH transmission with repetition Type A by the first DCI format. The FIG. 7 is an example of the PUSCH transmission with repetition Type A without frequency hopping. On the other hand, the FIG. 9(A) is an example of the PUSCH transmission with repetition Type A with intra-slot frequency hopping. FIG. 9(B) is an example of the PUSCH transmission with repetition Type A with inter-slot frequency hopping. The symbols allocation and the number of repetition number described in the FIG. 7 can apply to the FIG. 9.

In case that intra-slot frequency hopping is enabled for a PUSCH transmission with repetition Type A, each repetition of the PUSCH transmission within in a slot is divided into two hops (or two frequency hops), i.e. the first hop and the second hop. The first repetition of the PUSCH transmission in a slot Ks is divided into the first hop 901 and the second hop 902. The second repetition of the PUSCH transmission in a slot $K_s+1$ is divided into the first hop 903 and the second hop 904. The third repetition of the PUSCH transmission in a slot $K_s+2$ is divided into the first hop 905 and the second hop 906.

The number of symbols in each first hop is given by $\mathrm{floor}(N_{symb}^{PUSCH}/2)$. That is, in a slot where the PUSCH is transmitted, the first $\mathrm{floor}(N_{symb}^{PUSCH}/2)$ symbol(s) of PUSCH transmission with allocated duration $N_{symb}^{PUSCH}$ (i.e. L) are symbol(s) in the first hop. While the number of symbols in the second hop is given by $N_{symb}^{PUSCH}-\mathrm{floor}(N_{symb}^{PUSCH}/2)$, i.e. $\mathrm{ceiling}(N_{symb}^{PUSCH}/2)$. That is, in a slot where the PUSCH is transmitted, the last $\mathrm{ceiling}(N_{symb}^{PUSCH}/2)$ symbol(s) of PUSCH transmission with allocated duration $N_{symb}^{PUSCH}$ are symbol(s) in the second hop.

A PUSCH frequency resource allocation field in the first DCI format is used to indicate the frequency resource allocation for the PUSCH in the active UL BWP. The PUSCH frequency resource allocation field consists of a resource indication value (RIV) corresponding to a starting resource block $RB_{start}$ and a length of contiguously allocated resource blocks $L_{RBs}$ within the active UL BWP. The number of the starting resource block $RB_{start}$ starts from the first (lowest) RB of the active UL BWP. The $RB_{start}$ is the starting RB for each first hop of the repetitions of the PUSCH transmission. The allocated resource blocks $L_{RBs}$ is a number of resource blocks allocated for each first hop in frequency domain. The starting RB for each second hop of the repetitions of the PUSCH transmission in the frequency domain is given depending on the starting RB for the first hop and a frequency offset. The frequency offset between the first hop and the second hop in resource blocks can be provided by RRC parameters.

In a case that inter-slot frequency hopping is enabled for a PUSCH transmission with repetition Type A, the UE 102 may perform frequency hopping for PUSCH transmission across slots. Each repetition of the PUSCH transmission within in a slot can be regarded as a hop. The first repetition of the PUSCH transmission 911 is transmitted in the slot $K_s$. The second repetition of the PUSCH transmission 912 is transmitted in the slot $K_s+1$. The third repetition of the PUSCH transmission 913 is transmitted in the slot $K_s+2$. For convenience, for each repetition (transmission) of the PUSCH transmission which is transmitted in a slot with slot number $n_s^{\mu}$, if $n_s^{\mu}$ mod 2=0, the starting RB for each repetition of the PUSCH transmission is given as $RB_{start}$. On the other hand, for each repetition (transmission) of the PUSCH transmission which is transmitted in a slot with slot number $n_s^{\mu}$, if $n_s^{\mu}$ mod 2=1, the starting RB for each repetition of the PUSCH transmission is given based on $RB_{start}$ and a frequency offset. The frequency offset in resource blocks can be provided by RRC parameters.

Figure 10:
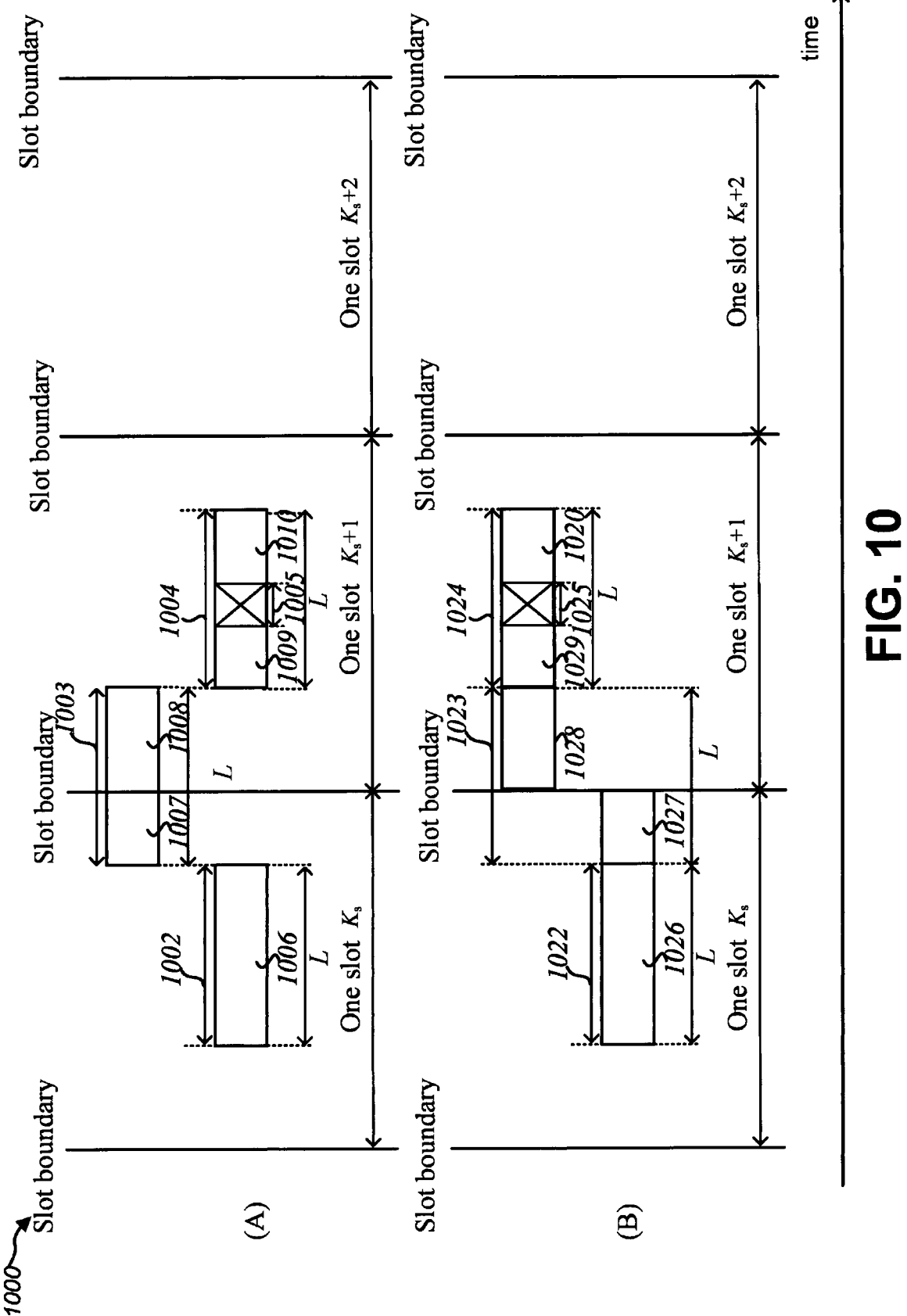
FIG. 10 is a diagram illustrating one example 1000 of frequency hopping for a PUSCH transmission with repetition Type B.

FIG. 10 is a diagram illustrating one example 1000 of frequency hopping for a PUSCH transmission with repetition Type B.

Two frequency hopping modes are defined for a PUSCH transmission with repetition Type B. One is inter-repetition frequency hopping and the other one is inter-slot frequency hopping. The UE 102 can be configured one of the two frequency hopping modes by a RRC parameter for PUSCH repetition Type B. That is, the base station 160 may indicate the UE 102 which frequency hopping mode is configured to a PUSCH transmission via a RRC parameter. The RRC parameter is specific to a DCI format. If the UE 102 is configured to monitor both DCI format 0_1 and DCI format 0_2, the base station may provide the UE 102 two RRC parameters frequencyHoppingDCI-0-1 and frequencyHoppingDCI-0-2. The frequencyHoppingDCI-0-1 is used to indicate UE which frequency hopping mode is applied to a PUSCH transmission with repetition Type B scheduled by DCI format 0_1. Similarly, the frequencyHoppingDCI-0-2 is used to indicate UE which frequency hopping mode is applied to a PUSCH transmission with repetition Type B scheduled by DCI format 0_2. The intra-slot frequency hopping mode can be configured for a PUSCH transmission with repetition Type B.

Upon detection of the PDCCH with a first DCI format, the UE 102 is scheduled with a PUSCH transmission with repetition Type B by the first DCI format. The above-mentioned FIG. 8 is an example of the PUSCH transmission with repetition Type B without frequency hopping. On the other hand, the FIG. 10(A) is an example of the PUSCH transmission with repetition Type B with inter-repetition frequency hopping. FIG. 10 (B) is an example of the PUSCH transmission with repetition Type B with inter-slot frequency hopping. The symbols allocation and the number of repetition number described in the FIG. 8 can apply to the FIG. 10.

In case that inter-repetition frequency hopping is enabled for a PUSCH transmission with repetition Type B, the UE 102 may perform frequency hoping for PUSCH transmission across nominal repetitions. Each nominal repetition of the PUSCH transmission can be regarded as a hop, regardless of whether the nominal repetition crosses the slot boundary or not. The first nominal repetition 1002 in the slot $K_s$ is one hop. The second nominal repetition 1003 in the slot $K_s$ and the slot $K_s+1$ is one hop. The third nominal repetition 1004 in the slot $K_s+1$ is one hop.

For an actual repetition within a n-th nominal repetition, if n mod 2=0, the starting RB for the actual repetition is given by $RB_{start}$. On the other hand, for an actual repetition within a n-th nominal repetition, if n mod 2=1, the starting RB for the actual repetition is given based on RB start and a frequency offset. For example, the starting RB for the actual repetition is given by $(RB_{start}+RB_{offset})\bmod N_{BWP}^{size}$. The frequency offset $RB_{offset}$ in resource blocks can be provided by RRC parameters. $N_{BWP}^{size}$ is a frequency-domain size of the active UL BWP in unit of resource block, i.e. a number of resource blocks of the active UL BWP. Therefore, if one or more actual repetitions are within a same nominal repetition, the starting RBs for the one or more actual repetitions are same. As shown in the FIG. 10(A), the first actual repetition 1006 within the first nominal repetition 1002, the fourth actual repetition 1009 and the fifth actual repetition 1010 within the third nominal repetition 1011 have a same starting RB, i.e. $RB_{start}$. The second actual repetition 1007 and the third actual repetition 1008 within the second nominal repetition 103 have a same starting RB, i.e. $(RB_{start}+RB_{offset})\bmod N_{BWP}^{size}$.

In case that inter-slot frequency hopping is enabled for a PUSCH transmission with repetition Type B, the UE 102 may perform frequency hoping for PUSCH transmission across slots. One or multiple actual repetitions within a slot can be regarded as a hop, regardless of whether these actual repetitions are within a same nominal repetition or different nominal repetitions.

The first actual repetition 1026 within the first nominal repetition 1022 and the second actual repetition 1027 within the second nominal repetition 1023 have a same starting RB. On the other hand, the third actual repetition 1028 within the second nominal repetition 1023, the fourth actual repetition 1029 and the fifth actual repetition 1020 within the third nominal repetition 1024 have a same starting RB. The staring RB determination for actual repetitions during a slot for PUSCH repetition Type B is same as that for PUSCH repetition Type A as above mentioned.

As above-mentioned, the base station 160 may transmit, to the UE 102, a PDCCH with a first DCI format where the first DCI format schedules a PUSCH transmission.

In an example, the PUSCH repetition Type A is applied to the PUSCH transmission. That is, the PUSCH transmission scheduled by the first DCI format is a PUSCH transmission with repetition Type A. Herein, the number of repetition K for the PUSCH transmission with repetition Type A can be 1 or an integer larger than 1. In the example, intra-slot frequency hopping is enabled for the physical channel, e.g. the PUSCH transmission. The UE 102 may receive, from the base station 160, the PDCCH with the first DCI format. The UE 102 may perform the PUSCH transmission such that a first channel over which a first symbol on an antenna port used for an uplink transmission (e.g. the PUSCH transmission and/or its associated DMRS(s)) is conveyed can be inferred by the base station 160 from a second channel over which a second symbol on the same antenna port is conveyed if the first symbol and the second symbol correspond to the same hop, regardless of whether the frequency hop distance (i.e. the frequency offset between the first hop and the second hop) is zero or not. The base station 160 may perform the PUSCH reception such that the first channel over which the first symbol on an antenna port used for an uplink transmission is conveyed can be inferred by the base station 160 from the second channel over which the second symbol on the same antenna port is conveyed if the first symbol and the second symbol correspond to the same hop, regardless of whether the frequency hop distance is zero or not.

In an example, the PUSCH repetition Type A is applied to the PUSCH transmission. That is, the PUSCH transmission scheduled by the first DCI format is a PUSCH transmission with repetition Type A. Herein, the number of repetition K for the PUSCH transmission with repetition Type A can be 1 or an integer larger than 1. In the example, intra-slot frequency hopping is not enabled by a RRC parameter for the physical channel, e.g. the PUSCH transmission. That is, inter-slot frequency hopping is enabled by a RRC parameter for the PUSCH transmission. Alternatively, no frequency hopping is configured/determined for the PUSCH transmission. The UE 102 may receive, from the base station 160, the PDCCH with the first DCI format. The UE 102 may perform the PUSCH transmission such that a first channel over which a first symbol on an antenna port used for an uplink transmission (e.g. the PUSCH transmission and/or its associated DMRS(s)) is conveyed can be inferred by the base station 160 from a second channel over which a second symbol on the same antenna port is conveyed if the first symbol and the second symbol correspond to the same slot. The base station 160 may perform the PUSCH reception such that the first channel over which the first symbol on an antenna port used for an uplink transmission is conveyed can be inferred by the base station 160 from the second channel over which the second symbol on the same antenna port is conveyed if the first symbol and the second symbol correspond to the same slot.

In an example, the PUSCH repetition Type B is applied to the PUSCH transmission. That is, the PUSCH transmission scheduled by the first DCI format is a PUSCH transmission with repetition Type B. Herein, the number of nominal repetitions K for the PUSCH transmission with repetition Type B can be 1 or an integer larger than 1. The number of actual repetition(s) within the K nominal repetition(s) may be same as or larger than the number of nominal repetition(s) K. The UE 102 may receive, from the base station 160, the PDCCH with the first DCI format. The UE 102 may perform the PUSCH transmission such that a first channel over which a first symbol on an antenna port used for an uplink transmission (e.g. the PUSCH transmission and/or its associated DMRS(s)) is conveyed can be inferred by the base station 160 from a second channel over which a second symbol on the same antenna port is conveyed if the first symbol and the second symbol correspond to a same actual repetition of the PUSCH transmission. The base station 160 may perform the PUSCH reception such that the first channel over which the first symbol on an antenna port used for an uplink transmission is conveyed can be inferred by the base station 160 from the second channel over which the second symbol on the same antenna port is conveyed if the first symbol and the second symbol correspond to the same actual repetition of the PUSCH transmission. If the first symbol and the second symbol are within a same slot but correspond to different actual repetitions of the PUSCH transmission, the UE 102 may not perform the PUSCH transmission such that the first channel can be inferred by the base station 160 from the second channel, and the base station 160 may not perform the PUSCH reception such that the first channel can be inferred by the base station 160 from the second channel.

According to the above examples, in a case that the PUSCH transmission Type B is applied to a physical channel (e.g. a PUSCH transmission), the UE may perform the PUSCH transmission such that a first channel over which a first symbol on an antenna port used for an uplink transmission (e.g. the PUSCH transmission and/or its associated DMRS(s)) is conveyed can be inferred by the base station 160 from a second channel over which a second symbol on the same antenna port is conveyed if the first symbol and the second symbol correspond to a same actual repetition of the PUSCH transmission, regardless of which frequency hopping mode is enabled, and/or regardless of whether frequency hopping or no frequency hopping is configured for the PUSCH transmission. In this case, the base station may perform the PUSCH reception such that a first channel over which a first symbol on an antenna port used for an uplink transmission (e.g. the PUSCH transmission and/or its associated DMRS(s)) is conveyed can be inferred by the base station 160 from a second channel over which a second symbol on the same antenna port is conveyed if the first symbol and the second symbol correspond to a same actual repetition of the PUSCH transmission, regardless of which frequency hopping mode is enabled, and/or regardless of whether frequency hopping or no frequency hopping is applied for the PUSCH transmission. The physical channel may refer to an actual repetition of a PUSCH transmission with repetition Type B. Additionally or alternatively, the physical channel may refer to a PUSCH transmission with repetition Type B across one or multiple slots. Additionally or alternatively, the physical channel may refer to actual repetition(s) within the K nominal repetitions of a PUSCH transmission with repetition Type B across one or multiple slots.

On the other hand, in a case that the PUSCH transmission Type A is applied to a physical channel (i.e. in a case that the PUSCH transmission Type B is not applied to a physical channel), the UE may perform the PUSCH transmission such that whether a first channel over which a first symbol on an antenna port used for an uplink transmission (e.g. the PUSCH transmission and/or its associated DMRS(s)) is conveyed can be inferred by the base station 160 from a second channel over which a second symbol on the same antenna port is conveyed based on which frequency hopping modes is enabled or based on whether the intra-slot frequency is enabled or not. In a case that the intra-slot frequency hopping is enabled, if the first symbol and the second symbol correspond to a same hop, the first channel can be inferred from the second channel. That is, in this case, if the first symbol and the second symbol correspond to a same slot but correspond to a different hops, the first channel cannot be inferred from the second channel. In a case that intra-slot frequency hopping is not enabled, i.e. the inter-slot frequency hopping is enabled or no frequency hopping is applied, if the first symbol and the second symbol correspond to a same slot, the first channel can be inferred from the second channel. The physical channel herein may refer to a PUSCH transmission with repetition Type A across one or multiple slots. Additionally or alternatively, the physical channel may refer to a repetition of the PUSCH transmission with repetition Type A within one slot. Additionally or alternatively, the physical channel may refer to repetition(s) of a PUSCH transmission with repetition Type A across one or multiple slots.

Additionally or alternatively, in a case that intra-slot frequency hopping is not enabled by a RRC parameter for a physical channel, the UE may perform the PUSCH transmission such that a first channel over which a first symbol on an antenna port used for an uplink transmission (e.g. the PUSCH/PUCCH transmission and/or its associated DMRS(s)) is conveyed can be inferred by the base station 160 from a second channel over which a second symbol on the same antenna port is conveyed, if the first symbol and the second symbol correspond to a same slot and if PUSCH repetition Type B is not applied, or if the first symbol and the second symbol correspond to the same actual repetition of a PUSCH transmission with repetition Type B. The bases station may perform the PUSCH reception such that a first channel over which a first symbol on an antenna port used for an uplink transmission (e.g. the PUSCH/PUCCH transmission and/or its associated DMRS(s)) is conveyed can be inferred by the base station 160 from a second channel over which a second symbol on the same antenna port is conveyed, if the first symbol and the second symbol correspond to a same slot and if PUSCH repetition Type B is not applied, or if the first symbol and the second symbol correspond to the same actual repetition of a PUSCH transmission with repetition Type B.

Additionally or alternatively, in a case that intra-slot frequency hopping is not enabled by a RRC parameter for a physical channel, the UE may perform the uplink transmission (PUSCH and/or PUCCH transmission) such that a first channel over which a first symbol on an antenna port used for an uplink transmission (e.g. the PUSCH/PUCCH transmission and/or its associated DMRS(s)) is conveyed can be inferred by the base station 160 from a second channel over which a second symbol on the same antenna port is conveyed if the first symbol and the second symbol correspond to K consecutive slot(s). In this case, the base station may perform uplink reception (PUSCH and/or PUCCH reception) such that a first channel over which a first symbol on an antenna port used for an uplink transmission (e.g. the PUSCH transmission and/or its associated DMRS(s)) is conveyed can be inferred by the base station 160 from a second channel over which a second symbol on the same antenna port is conveyed if the first symbol and the second symbol correspond to if the first symbol and the second symbol correspond to K consecutive slot(s). Herein, the PUSCH transmission with repetitions are back-to-back PUSCH transmission of a same TB across K consecutive slots. The PUCCH transmission with repetitions are back-to-back PUCCH transmission across K consecutive slots in response to a PDSCH. That is, each repetition of the PUSCH and/or the PUCCH transmission is within one slot and is transmitted in whole slot. A n-th repetition consecutively follows a (n−1) repetition. The value of K is determined based on one, more or all of a DCI field, RRC parameter(s), a MAC CE in a PDSCH. The value of K can be 1 or an integer larger than 1. Additionally or alternatively, the physical channel herein may refer to a PUSCH transmission with repetition Type A across one or multiple slots. Additionally or alternatively, the physical channel may refer to repetition(s) of the PUSCH transmission with repetition Type A within K consecutive slots. Additionally or alternatively, the physical channel may refer to repetition(s) of a PUCCH transmission with repetition across K consecutive slots. Additionally or alternatively, the physical channel herein may refer to a PUCCH transmission with repetition across one or multiple slots.

In various examples of the present disclosure, the first symbol may be a symbol for DMRS transmission. The second symbol may be a symbol for PUSCH transmission. Additionally or alternatively, the first symbol may be a symbol for PUSCH transmission. The second symbol may be a symbol for PUSCH transmission. Additionally or alternatively, the first symbol may be a symbol for DMRS transmission. The second symbol may be a symbol for DMRS transmission. Additionally or alternatively, the first symbol may be a symbol for PUSCH transmission. The second symbol may be a symbol for DMRS transmission.

Figure 11:
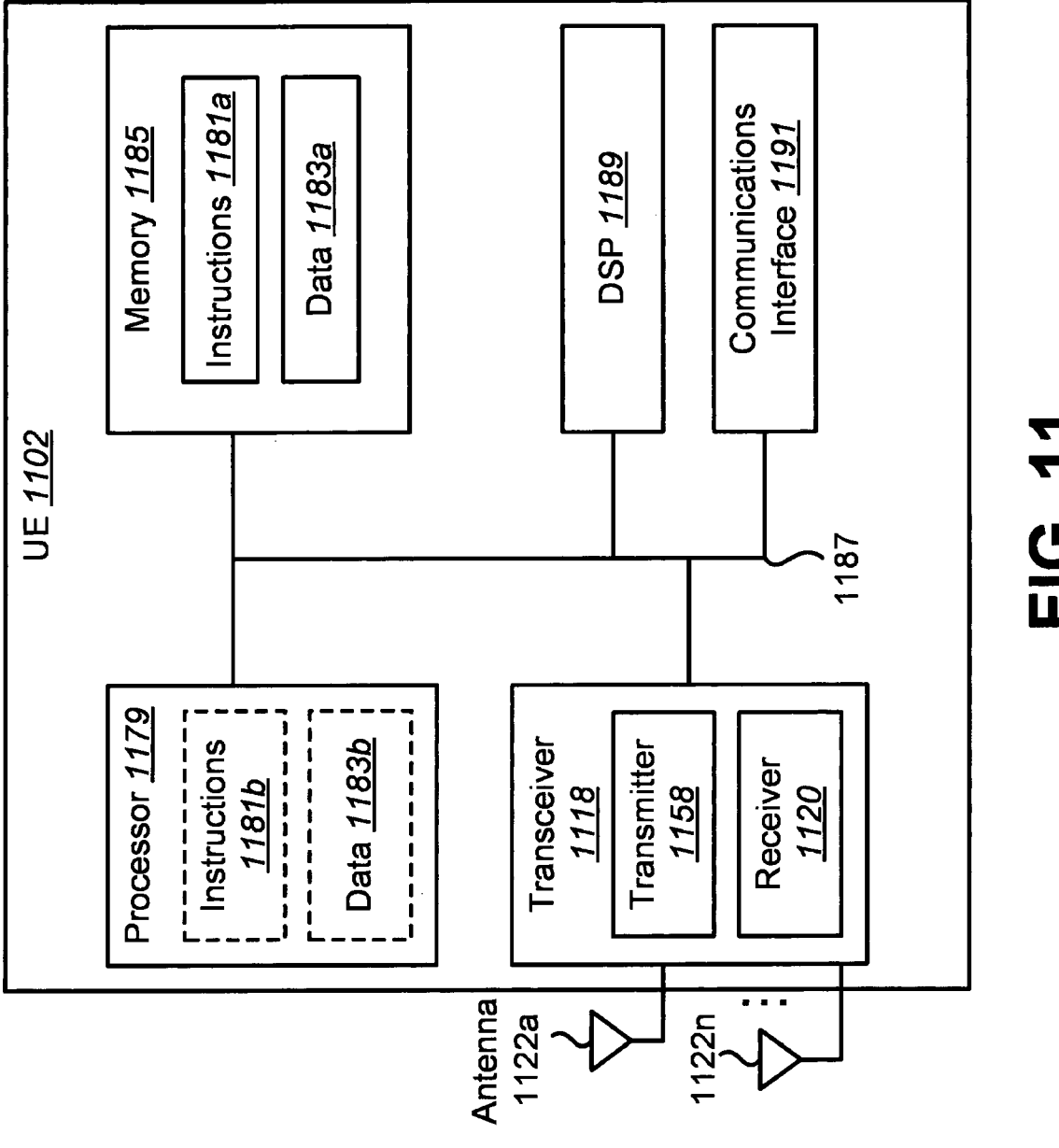
FIG. 11 illustrates various components that may be utilized in a UE.

FIG. 11 illustrates various components that may be utilized in a UE 1102. The UE 1102 (UE 102) described in connection with FIG. 11 may be implemented in accordance with the UE 102 described in connection with FIG. 1. The UE 1102 includes a processor 1181 that controls operation of the UE 1102. The processor 1181 may also be referred to as a central processing unit (CPU). Memory 1187, which may include read-only memory (ROM), random access memory (RAM), a combination of the two or any type of device that may store information, provides instructions 1183a and data 1185a to the processor 1181. A portion of the memory 1187 may also include non-volatile random access memory (NVRAM). Instructions 1183b and data 1185b may also reside in the processor 1181. Instructions 1183b and/or data 1185b loaded into the processor 1181 may also include instructions 1183a and/or data 1185a from memory 1187 that were loaded for execution or processing by the processor 1181. The instructions 1183b may be executed by the processor 1181 to implement one or more of the methods 200 described above.

The UE 1102 may also include a housing that contains one or more transmitters 1158 and one or more receivers 1120 to allow transmission and reception of data. The transmitter(s) 1158 and receiver(s) 1120 may be combined into one or more transceivers 1118. One or more antennas 1122a-n are attached to the housing and electrically coupled to the transceiver 1118.

The various components of the UE 1102 are coupled together by a bus system 1189, which may include a power bus, a control signal bus and a status signal bus, in addition to a data bus. However, for the sake of clarity, the various buses are illustrated in FIG. 11 as the bus system 1189. The UE 1102 may also include a digital signal processor (DSP) 1191 for use in processing signals. The UE 1102 may also include a communications interface 1193 that provides user access to the functions of the UE 1102. The UE 1102 illustrated in FIG. 11 is a functional block diagram rather than a listing of specific components.

Figure 12:
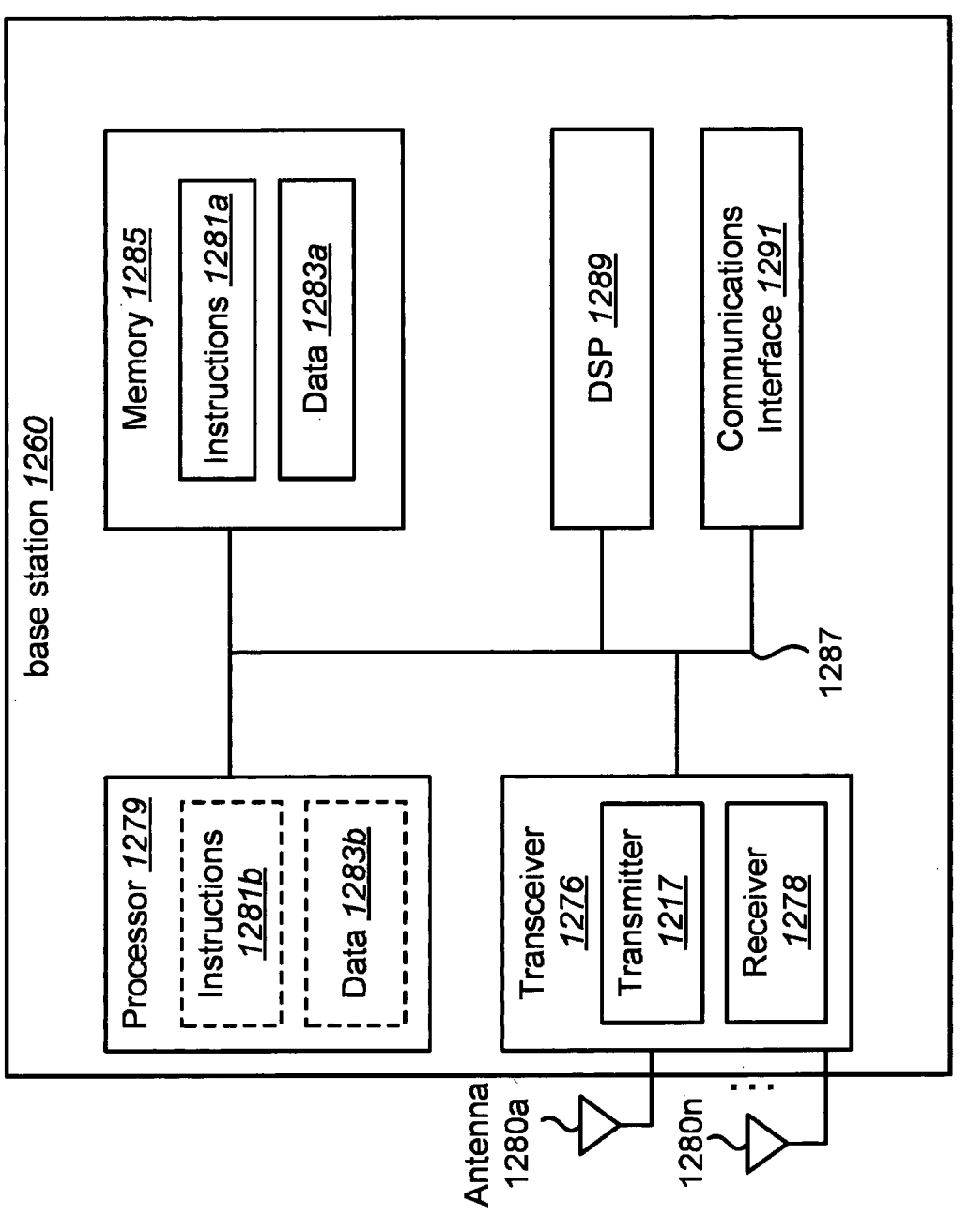
FIG. 12 illustrates various components that may be utilized in a base station.

FIG. 12 illustrates various components that may be utilized in a base station 1260. The base station 1260 described in connection with FIG. 12 may be implemented in accordance with the base station 160 described in connection with FIG. 1. The base station 1260 includes a processor 1281 that controls operation of the base station 1260. The processor 1281 may also be referred to as a central processing unit (CPU). Memory 1287, which may include read-only memory (ROM), random access memory (RAM), a combination of the two or any type of device that may store information, provides instructions 1283a and data 1285a to the processor 1281. A portion of the memory 1287 may also include non-volatile random access memory (NVRAM). Instructions 1283b and data 1285b may also reside in the processor 1281. Instructions 1283b and/or data 1285b loaded into the processor 1281 may also include instructions 1283a and/or data 1285a from memory 1287 that were loaded for execution or processing by the processor 1281.

The instructions 1283b may be executed by the processor 1281 to implement one or more of the methods 300 described above.

The base station 1260 may also include a housing that contains one or more transmitters 1217 and one or more receivers 1278 to allow transmission and reception of data. The transmitter(s) 1217 and receiver(s) 1278 may be combined into one or more transceivers 1276. One or more antennas 1280a-n are attached to the housing and electrically coupled to the transceiver 1276.

The various components of the base station 1260 are coupled together by a bus system 1289, which may include a power bus, a control signal bus and a status signal bus, in addition to a data bus. However, for the sake of clarity, the various buses are illustrated in FIG. 12 as the bus system 1289. The base station 1260 may also include a digital signal processor (DSP) 1291 for use in processing signals. The base station 1260 may also include a communications interface 1293 that provides user access to the functions of the base station 1260. The base station 1260 illustrated in FIG. 12 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using circuitry, a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A user equipment (UE), comprising:
reception circuitry configured to receive, from a base station, a physical downlink control channel (PDCCH) with a first downlink control information (DCI) format, wherein the first DCI format schedules a physical uplink shared channel (PUSCH) transmission; and control circuitry configured to:

perform the PUSCH transmission in a case that intra-slot frequency hopping is not enabled for the PUSCH transmission and a PUSCH repetition Type B is not applied to the PUSCH transmission, such that a first channel, over which a first symbol on an antenna port used for an uplink transmission is conveyed, is inferable, by the base station, from a second channel, over which a second symbol on the same antenna port is conveyed, in a case that the first symbol and the second symbol correspond to the same slot, and perform the PUSCH transmission in a case that the PUSCH repetition Type B is applied to the PUSCH transmission, such that the first channel, over which the first symbol on an antenna port used for an uplink transmission is conveyed, is inferable, by the base station, from the second channel, over which the second symbol on the same antenna port is conveyed, in a case that the first symbol and the second symbol correspond to a same actual repetition of the PUSCH transmission.

2. The UE of claim 1, wherein in a case that the PUSCH repetition Type B is applied to the PUSCH transmission, and in a case that the first symbol and the second symbol correspond to different actual repetitions of the PUSCH transmission but are within a same slot, the first channel is not inferable, by the base station, from the second channel.

3. A base station, comprising:

transmission circuitry configured to transmit, to a user equipment (UE), a physical downlink control channel (PDCCH) with a first downlink control information (DCI) format, wherein the first DCI format schedules a physical uplink shared channel (PUSCH) transmission; and control circuitry configured to;

perform a PUSCH reception in a case that intra-slot frequency hopping is not enabled for the PUSCH transmission and a PUSCH repetition Type B is not applied to the PUSCH transmission, such that a first channel, over which a first symbol on an antenna port used for an uplink transmission is conveyed, is inferable, by the base station, from a second channel, over which a second symbol on the same antenna port is conveyed, in a case that the first symbol and the second symbol correspond to the same slot, and perform the PUSCH reception in a case that the PUSCH repetition Type B is applied to the PUSCH transmission, such that the first channel, over which the first symbol on an antenna port used for an uplink transmission is conveyed, is inferable, by the base station, from the second channel, over which the second symbol on the same antenna port is conveyed, in a case that the first symbol and the second symbol correspond to a same actual repetition of the PUSCH transmission.

4. The base station of claim 3, wherein in a case that the PUSCH repetition Type B is applied to the PUSCH transmission, and in a case that the first symbol and the second symbol correspond to different actual repetitions of the PUSCH transmission but are within a same slot, the first channel is not inferable, by the base station, from the second channel.

5. A communication method by a user equipment (UE), comprising:

receiving, from a base station, a physical downlink control channel (PDCCH) with a first downlink control information (DCI) format, wherein the first DCI format schedules a physical uplink shared channel (PUSCH) transmission;

performing the PUSCH transmission, in a case that intra-slot frequency hopping is not enabled for the PUSCH transmission and a PUSCH repetition Type B is not applied to the PUSCH transmission, such that a first channel, over which a first symbol on an antenna port used for an uplink transmission is conveyed, is inferable, by the base station, from a second channel, over which a second symbol on the same antenna port is conveyed, in a case that the first symbol and the second symbol correspond to the same slot; and performing the PUSCH transmission in a case that the PUSCH repetition Type B is applied to the PUSCH transmission, such that the first channel, over which the first symbol on an antenna port used for an uplink transmission is conveyed, is inferable, by the base station, from the second channel, over which the second symbol on the same antenna port is conveyed, in a case that the first symbol and the second symbol correspond to a same actual repetition of the PUSCH transmission.

\* \* \* \* \*